United States Patent [19]
Weber

[11] 4,328,550
[45] May 4, 1982

[54] PROGRAMMER UNIT WITH COMPOSITE CALCULATION CAPABILITY

[76] Inventor: John M. Weber, 630 Colgate Rd., Colgate, Wis. 53017

[21] Appl. No.: 176,269

[22] Filed: Aug. 8, 1980

[51] Int. Cl.³ ............................................. G05B 19/42
[52] U.S. Cl. .................................... 364/474; 318/568; 364/900; 364/171; 364/192
[58] Field of Search ............... 364/474, 475, 120, 107, 364/118 MS File, 200 MS File, 900 MS File; 318/568, 567, 569, 570; 340/706, 711, 723

[56] References Cited

U.S. PATENT DOCUMENTS

| | | | |
|---|---|---|---|
| 3,828,318 | 8/1974 | Bennett et al. | 318/568 X |
| 3,857,025 | 12/1974 | English et al. | 364/107 X |
| 4,010,356 | 3/1977 | Evans et al. | 318/568 X |
| 4,042,866 | 8/1977 | Morita et al. | 318/568 |
| 4,152,765 | 5/1979 | Weber | 364/474 |
| 4,204,253 | 5/1980 | van den Hanenberg et al. | 364/200 |

OTHER PUBLICATIONS

Davies–"GNC-A Graphical NC Processor–"Computer Aided Design Centre, Madingly Rd., Cambridge, England–Feb. 1974, pp. 1–12.

Primary Examiner—Joseph F. Ruggiero
Attorney, Agent, or Firm—Quarles & Brady

[57] ABSTRACT

A programmer unit for developing part programs for numerically controlled machines includes a keyboard through which the operator enters data and a display which outputs data. The programmer unit leads the operator through a series of steps which include the entry of selected composite numbers and the entry of geometric data taken from part drawings. When the required geometric data is not available on the drawing, a composite calculation mode of operation can be enabled by the operator and employed to calculate the required data from data that is available on the drawing.

5 Claims, 14 Drawing Figures

PROGRAMMER UNIT WITH COMPOSITE CALCULATION CAPABILITY

BACKGROUND OF THE INVENTION

The field of the invention is numerically controlled machine tools, and more particularly, the development of part programs for numerical control system on such machine tools.

Numerical control systems direct machine tools such as milling and drilling machines through a series of moves to machine a part. The desired series of moves form a part program which is input to the numerical control system. Such part programs may be stored on a magnetic or punched tape or they may be coupled through a communication link from a host computer in a DNC system. The format and coding of part programs for use on commercially available numerical control systems is standardized, and thus as a practical matter, a machine for developing such a part program must generate its work product in one of the standard forms.

In my prior U.S. Pat. No. 4,152,765 which issued on May 1, 1979, and which is entitled "Programmer Unit for N/C Systems", I disclosed a system for interactively leading an operator through a series of steps for developing a part program. The geometry of the part is broken down into segments called "composites" and the programmer unit asks the operator to enter specific dimensional data for each segment, or composite. Both the composites available to the operator for defining part geometry, and the type of dimensional data requested for each by the programmer unit appears frequently on part drawings. In a vast majority of cases, therefore, the operator describes part geometry by selecting a series of the available composite numbers and entering the requested dimensional data straight from the part drawing.

Two situations arise occasionally which require deviation from this standard procedure. First, the dimensions provided on the part drawing may be sufficient to define the geometry, but they may not be the particular parameters which the programmer unit requests. As a result, the operator must stop and perform complex geometric calculations to derive the required dimension from those dimensions which are provided on the drawing. Secondly, part drawings are occasionally over dimensioned—that is, more parameters are provided for a particular geometry than are required to define the specific shape. In itself this presents no problem, but occasionally one or more of these dimensions is rounded off or otherwise made inconsistent with another dimension on the drawing. A single shape is thus not defined and the operator must determine which dimensions are inconsistent so that he can choose the correct one.

SUMMARY OF THE INVENTION

The present invention relates to a programmer unit for developing a part program for a numerical control system. More specifically, the programmer unit includes a keyboard for entering data; a plurality of composite definition means which may each be selected by data entered through the keyboard, and which when selected, require the operator to enter a specific set of dimensions that define a unique geometric shape; composite calculation means which may be selected by data entered through the keyboard while a part program is being developed, and which includes means for selecting a composite number associated with one of said composite definition means, means for inputting dimensional data through said keyboard related to a unique geometric shape, and means responsive to the selected composite number and the input dimensional data for calculating the values of the specific set of dimensions required by the associated composite definition means to define the unique geometric shape; and means for displaying the calculated values of the specific set of dimensions.

A general object of the invention is to enable an operator of a programmer unit which requires the entry of a specific set of dimensional data, to calculate the specific set of dimensional data from other dimensional data associated with the same geometric shape. As the operator is developing the part program by selecting composite numbers and entering the set of dimensional data associated with each, he may also select the composite calculation means and a composite number. The composite calculation means prompts the operator to enter all of the dimensional data available and it then calculates all of the remaining dimensional data needed to continue with the part program development.

Another object of the invention is to enable the operator to check the accuracy of dimensional data on part drawings. The composite calculation means is selected along with a composite number, and the dimensional data on the drawing is entered. The composite calculation means not only displays the two inconsistant dimensions, but also prompts the operator to select the correct one.

A more specific object of the invention is to enable the operator to quickly prepare a part program from drawings which are dimensioned in unusual ways. The operator may deviate from the preparation of the part program at any time and call upon the composite calculation means to check the accuracy of dimensions or to calculate dimensions needed to proceed with the part program. In either case, the operator may return to part program preparation immediately at the point where he left off.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

Description of the Preferred Embodiment

Figure 1:
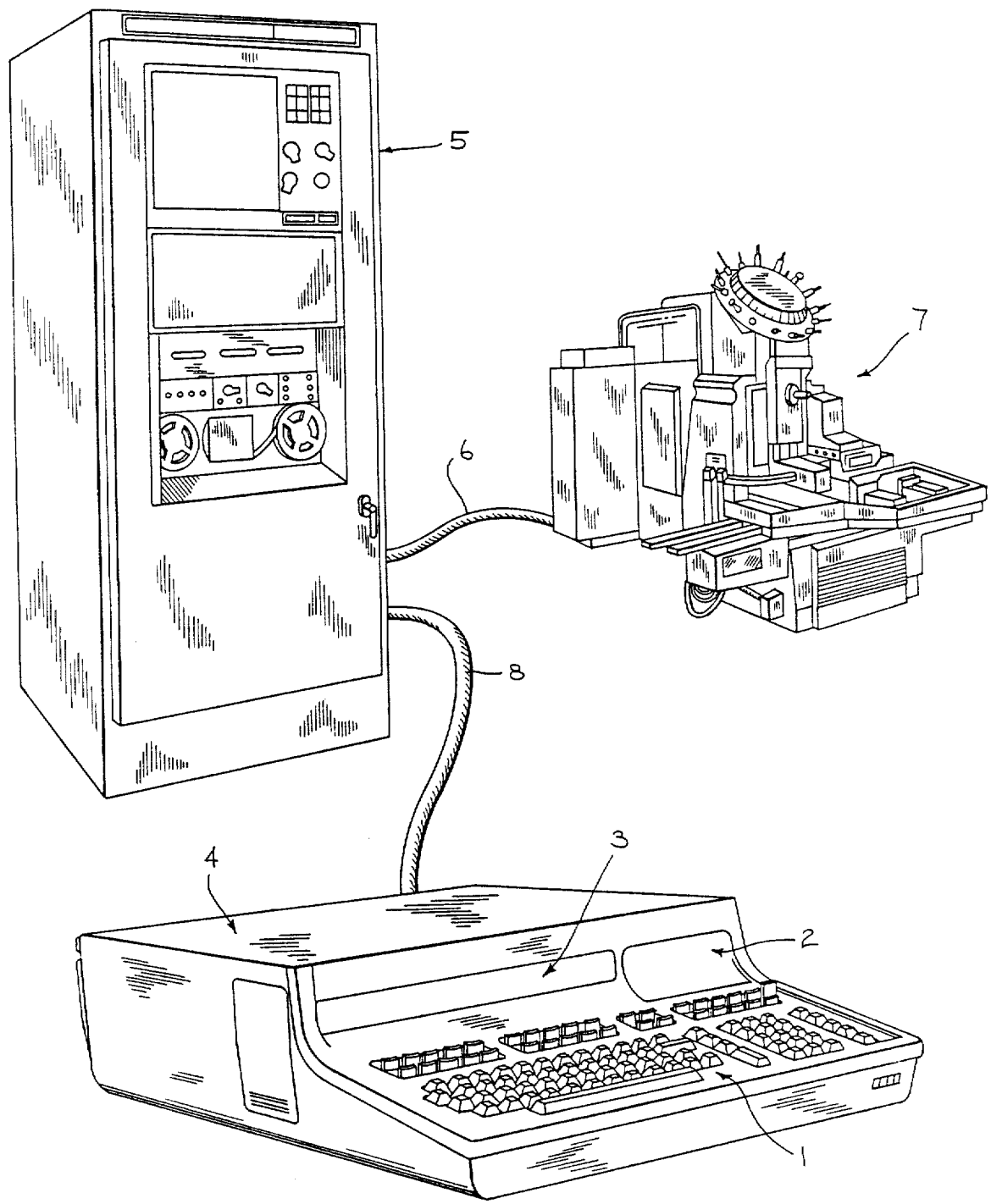
FIG. 1 is a perspective view of the invented programmer connected to a numerical control system.

Referring to FIG. 1, the numerical control programmer unit includes a keyboard unit 1 for entering information into and controlling the operation of the programmer unit. It also includes a magnetic tape cassette unit 2 for recording information stored in the programmer unit and for loading recorded information into the programmer unit. The programmer unit also includes a solid state output display unit 3 which provides visual indication of alpha-numeric data stored within the programmer. All of these elements are contained within a single housing 4 which may be easily transported to a selected site.

The numerical control programmer unit may, for example, connect to the DNC interface terminal on a numerical control system 5 through a cable 8. The program developed with the use of the programmer unit may thus be directly transferred to the numerical control system 5 which uses it to control a multi-axis machine tool 7 through a cable 6. As will be described in more detail hereinafter, other input and output devices may be connected to the programmer unit to input data thereto and to store the program which is developed. The developed program may be stored on punched tape, for example, which may be used on the tape reader of most commercially availble numerical control systems.

Figure 2:
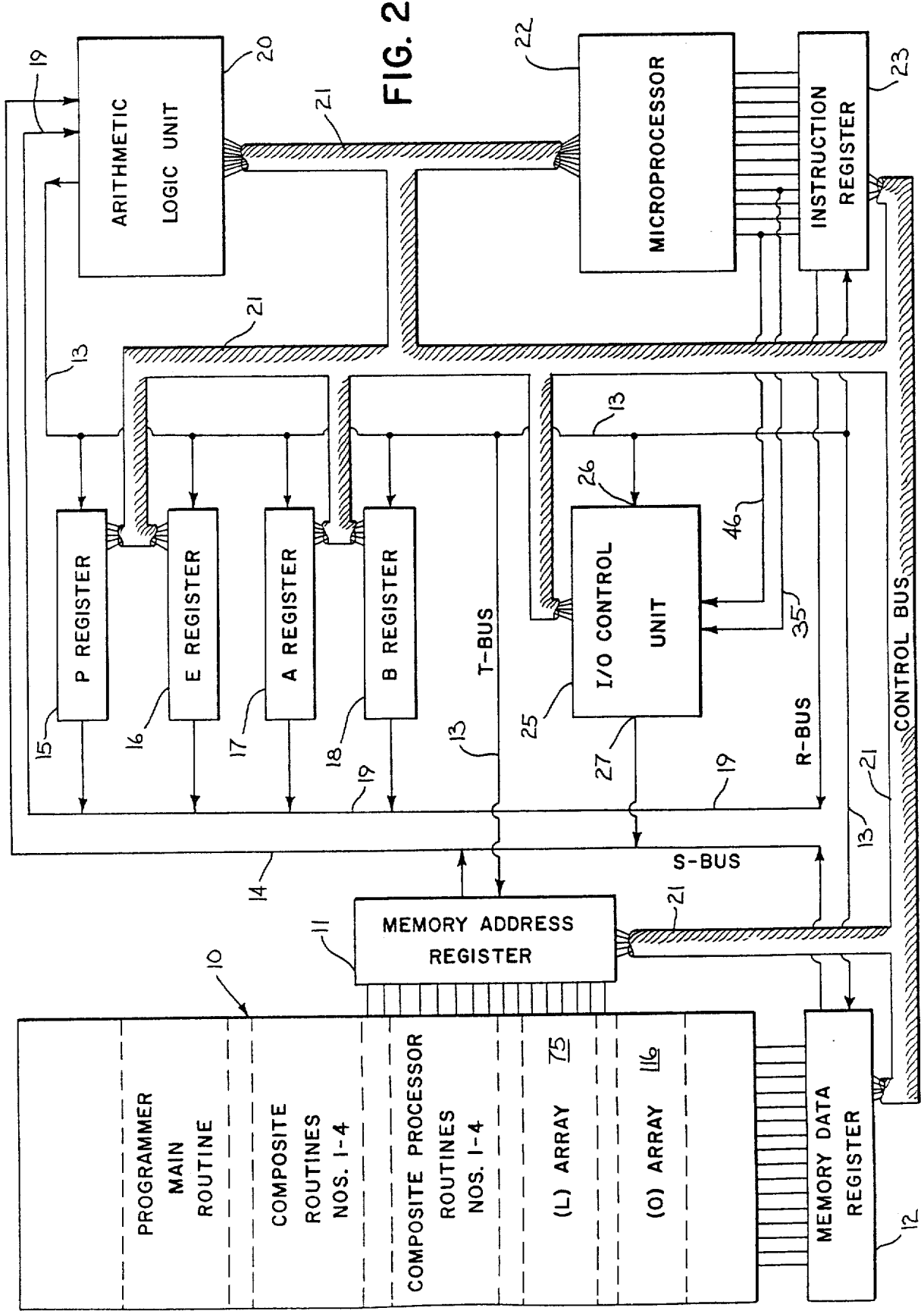
FIG. 2 is an electrical block diagram of the programmer.

Referring to FIG. 2, the programmer unit operates in response to instructions stored in a memory 10. The memory 10 is an MOS-type semiconductor memory which stores 16-bit words that are separately addressable through a memory address register 11. The addressed word in the memory 10 may be read out and stored in a 16-bit memory data register 12, or conversely, a 16-bit word in the memory data register 12 may be written into an addressed line of the memory 10. The registers 11 and 12 are recirculating 16-bit serial shift registers, each having a serial input terminal connected to a T-bus 13, and each having a serial output terminal connected to an S-bus 14. Data is coupled between the memory 10 and the other elements of the programmer through the T-bus 13 and the S-bus 14.

The programmer also includes four registers which connect to the T-bus 13 and an R-bus 19. These are identified as the P register 15, the E register 16, the A register 17 and the B register 18. The P, A and B registers are recirculating 16-bit serial shift registers having their serial inputs connected to the T-bus 13 and their serial outputs connected to the R-bus 19. The E register 16 is a four-bit shift register having its input connected to the T-bus 13 and its output connected to the R-bus 19. The P register 15 serves as the program counter and the A and B registers 17 and 18 serve as the accumulator registers. The E register serves as a serial extend register.

The T-bus 13, the S-bus 14 and the R-bus 19 connect to an arithmetic logic unit 20. The arithmetic logic unit 20 performs one-bit binary arithmetic on data received through the S-bus 14 or data received through The R-bus 19 and it may also perform logic operations on data received through the buses 14 and 19. The arithmetic and logic operations performed by the arithmetic logic unit 20 are determined by microinstructions which are received through a control bus 21 from a microprocessor 22. Results of arithmetic or logical operations performed by the arithmetic and logic unit 20 are transferred serially through the T-bus 13 to any one of the above described registers.

The operation of all elements in the programmer is determined by microinstructions generated on the control bus 21 by the microprocessor 22. The microprocessor 22 is in turn responsive to 16-bit macroinstructions which are stored in an instruction register 23. The instruction register 23 is a recirculating 16-bit shift register having its serial input connected to the T-bus 13 and its serial output connected to the R-bus 19. Its sixteen parallel output terminals connect to the microprocessor 22.

A basic machine operation consists of loading the contents of the P register 15 into the memory address register 11 and reading the macroinstruction on the addressed memory line out of the memory 10 and into the memory data register 12. The macroinstruction is then shifted to the instruction register 23 where it is applied to the microprocessor 22. The microprocessor 22 responds by issuing a series of microinstructions on the control bus 21 which operate the system elements to carry out the functions indicated by the macroinstruction. After the macroinstruction is executed, the program counter (P register 15) is incremented and the cycle repeats to execute the next macroinstruction. For a more detailed description of the structure of the programmer unit and the manner in which it operates to execute instructions, reference is made to U.S. Pat. No. 4,012,725 which issued on Mar. 15, 1977 and is entitled "Programmable Calculator."

Figure 3:
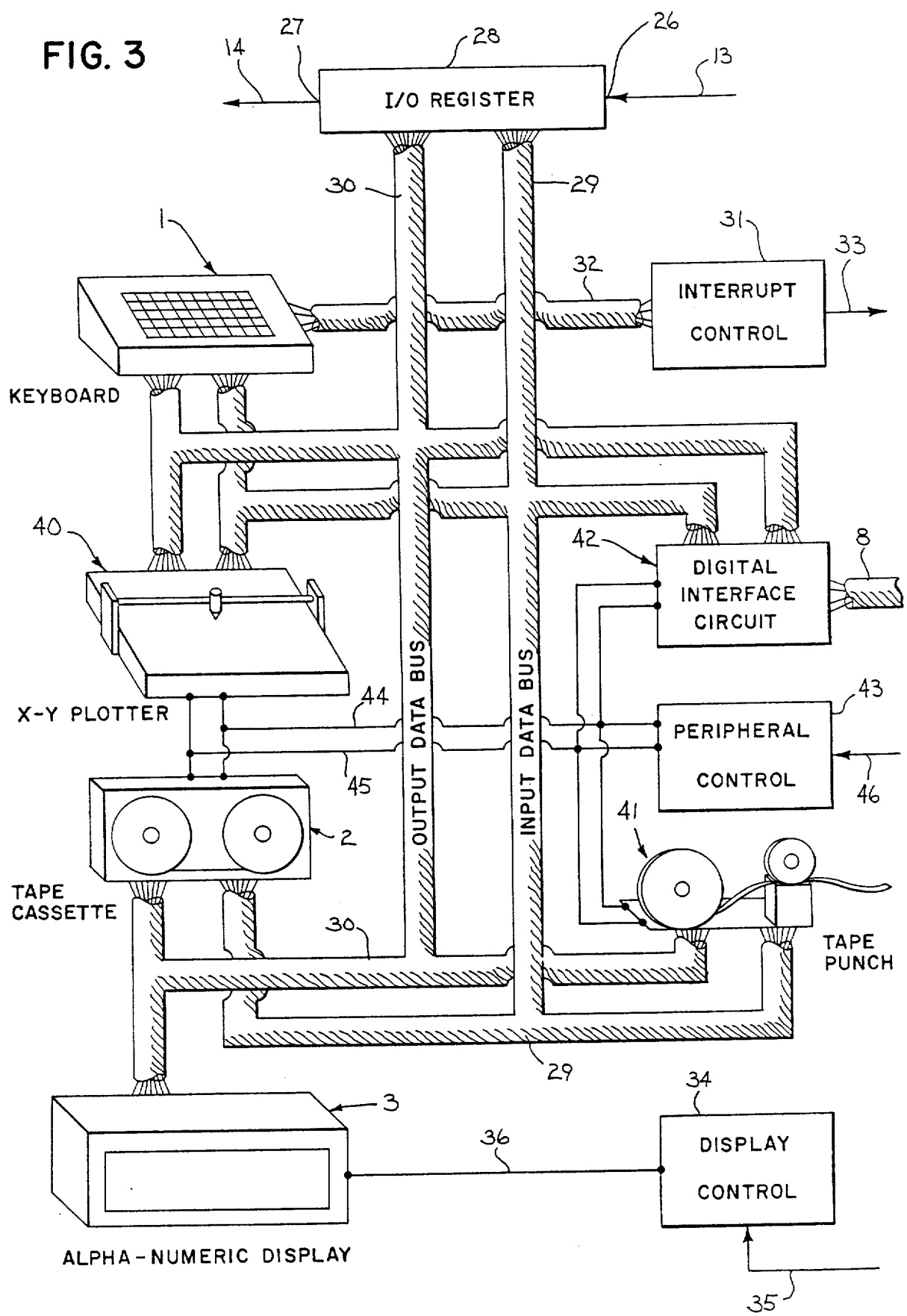
FIG. 3 is an electrical block diagram of the I/O control unit which forms part of the programmer of FIG. 2.

Data is coupled to and from the various I/O devices associated with the programmer through an I/O control unit 25. Referring particularly to FIGS. 2 and 3, the I/O control unit 25 has a serial input 26 which receives output data from the T-bus 13 and a serial output terminal 27 which connects to the S-bus 14. The input terminal 26 and the output terminal 27 are associated with a universal 16-bit I/O shift register 28 into which data may be transferred either bit-serially from the T-bus 13 or in parallel from an input data bus 29. Data may be transferred from the I/O register 28 either bit-serially to the S-bus 14 or in parallel to an output data bus 30.

The input data bus 29 and the output data bus 30 couple to a variety of I/O devices. Both buses 29 and 30 connect to the keyboard 1 and the tape cassette 2 and the output data bus 30 couples to the alpha-numeric display 3. Other peripheral devices including an X-Y plotter 40, a tape punch 41 and a digital interface circuit 42 connect to the input data bus 29 and the output data bus 30.

An interrupt control circuit 31 is connected to the keyboard 1 through a cable 32 and when a key is depressed, an interrupt request signal is generated through a lead 33 to the microprocessor 22. At the completion of the macroinstruction then being executed, the microprocessor 22 calls up an interrupt service routine stored in the memory 10. The interrupt service routine inputs the character from the keyboard 1 and then returns to the interrupted routine.

Associated with the alpha-numeric display 3 is a display control circuit 34 which has an input connected through a lead 35 to the fourth-bit output terminal on the instruction register 23. The display control circuit 34 connects to the alpha-numeric display 3 through a lead 36 and when data is to be output to the alpha-numeric display 3, it is enabled by the display control circuit 34. Such an operation is performed in response to an I/O macroinstruction stored in the instruction register 23. The I/O macroinstruction includes an operation code which indicates that data is to be output to the alpha-numeric display 3 and an operand which identifies the source of data to be output. The microprocessor 22 responds by generating microinstructions through the control bus 21 which couple the identified data through the T-bus 13 into the I/O register 28 and then on to the output data bus 30.

The digital interface circuit connects to the cable 8 which couples to the numerical control system 5 and it operates to provide an EIA-RS-232C compatible interface with the cable 8. Part program data developed with the use of the programmer unit may thus be coupled directly to the memory of the numerical control system 5 through the cable 8. This capability is particularly useful when the programmer is used in conjunction with numerical control systems which provide for the storage in their memory of entire part programs. While the part program is being developed, however, the interface circuit 42 is employed to communicate with a digital printer (not shown in the drawings) which provides a hard copy of the data generated during the part program development.

If direct coupling between the programmer unit and the numerical control system 5 is not desired, or not possible, the part program developed with the use of the programmer unit may be tested on the X-Y plotter 40 and then output to the tape punch 41. Operation of the tape cassette 2, X-Y plotter 40, tape punch 41 and digital interface circuit 42 is controlled by a peripheral control circuit 42 through a pair of control lines 44 and 45. The peripheral control circuit 43 connects through a lead 46 to the least significant digit output of the instruction register 23.

Figure 4:
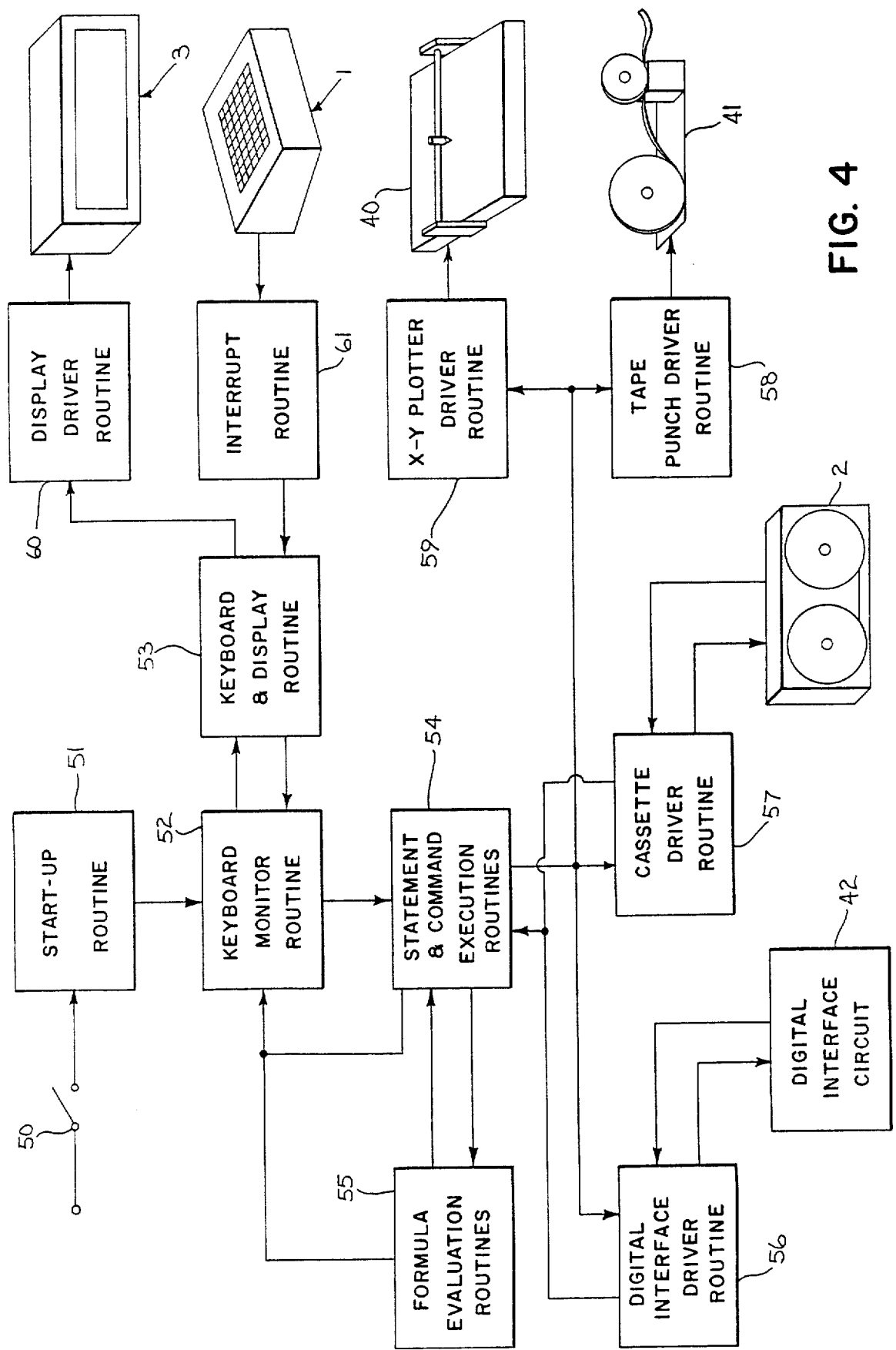
FIG. 4 is a schematic diagram of the system software of the programmer of FIG. 1, FIGS. 5 and 6 are flow charts of the programmer main routine which is stored in a memory which forms part of the programmer of FIG. 2.

Referring to FIG. 4, the basic system software components of the programmer unit comprise routines which are stored in the memory 10. When an on-off switch 50 is turned on a start-up routine 51 is executed to initialize certain variables and pointers and after its completion, control is passed to a keyboard monitor routine 52. The keyboard monitor routine calls for input data from the keyboard and display routine 53, and when such data is received, it searches mnemonic tables stored in the memory 10 to ascertain the identity of the statement or system command. When the input data is identified the system jumps to the appropriate routine. A separate syntax analysis routine is provided for each possible statement and an execution routine is provided for each possible system command. These are indicated collectively by the block 54.

Several of the statement and command execution routines require evaluation of arithmetic functions and expressions which is performed by formula evaluation routines 55. Other statements and commands require input from or output to one or more of the I/O devices, and accordingly, driver routines 56-59 for the respective I/O devices 42, 2, 41 and 40 ae provided. When a statement or system command has been executed, control is returned to the keyboard monitor routine 52.

The keyboard and display routine 53 periodically refreshes the display 3 through a display driver routine 60 and receives data from an interrupt routine 61. When a key on the keyboard 1 is depressed the interrupt control circuit 31 (FIG. 3) causes the system to jump to the interrupt routine 61. The interrupt routine 61 saves the keycode in a specified memory location and control is returned to the interrupted routine. The keyboard and display routine 53 reads this memory location and decides what operations need to be performed in response to that particular keycode. For a more detailed explanation of the basic system software, reference is made to the above-cited U.S. Pat. No. 4,012,725.

Figure 11:
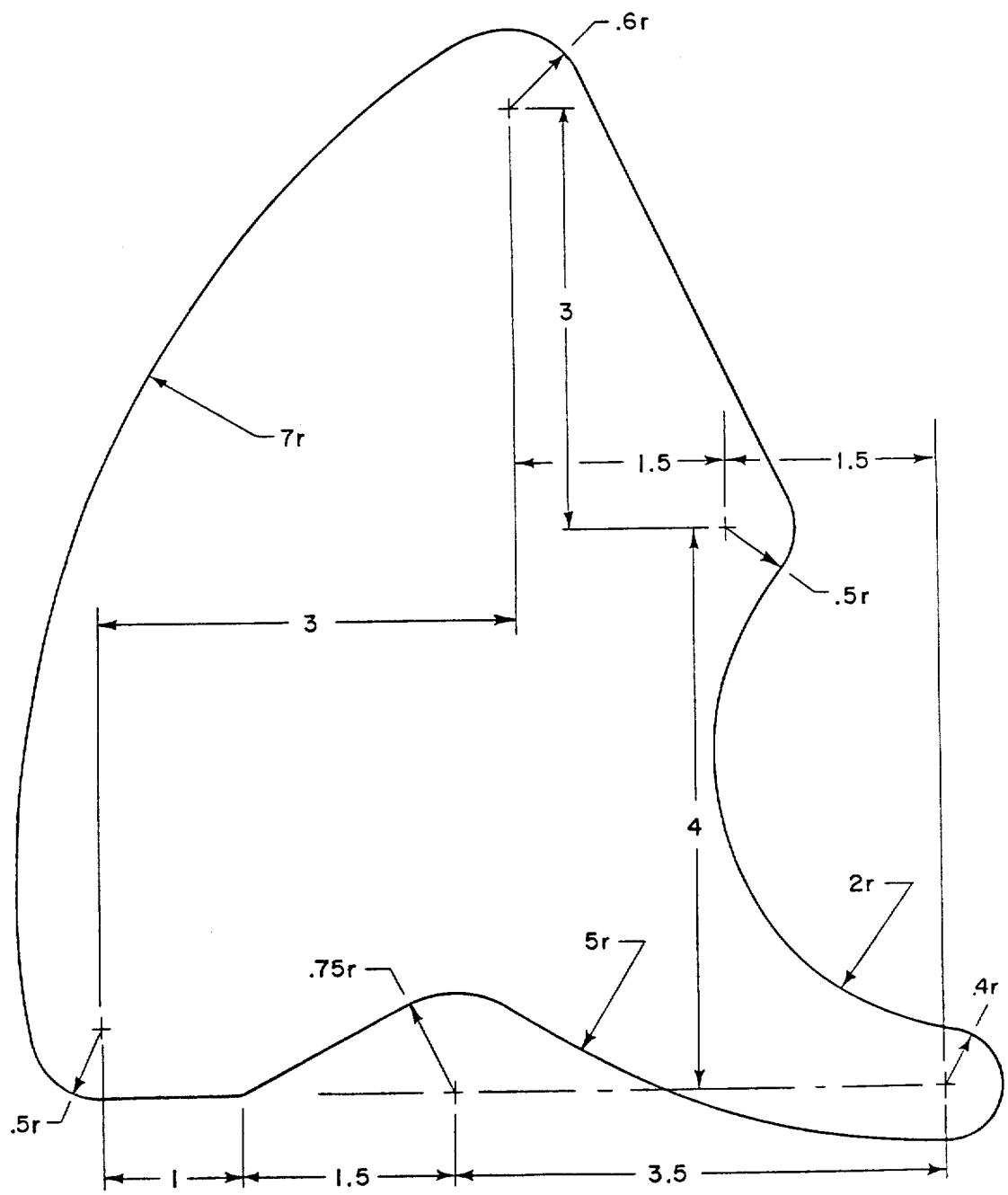
FIG. 11 is a sample part drawing dimensioned in a conventional manner.
Figure 12:
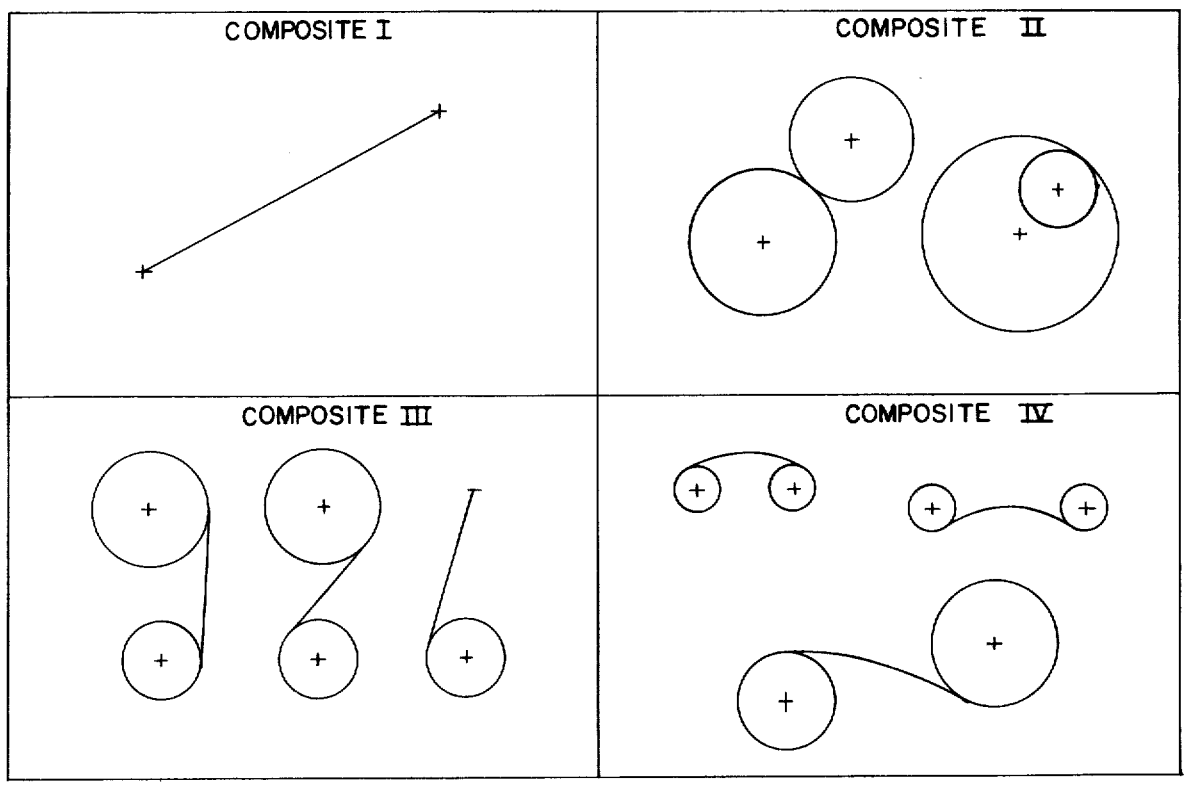
FIG. 12 is an illustration of the composite types accommodated by the preferred embodiment of the invention.

A general description of the programmer unit will now be made with respect to a typical part drawing. As shown in FIG. 11, a typical part drawing is comprised of a series of straight lines and circular arcs which are concatenated to form its outline. The number of different geometric shapes needed to form this outline on the vast majority of parts are relatively few in number. These selected geometric shapes are referred to herein as "composites," and as shown in FIG. 12, the preferred embodiment of the invention employs a set of four separate composites which are identified hereinafter as composites I-IV.

Figure 13:
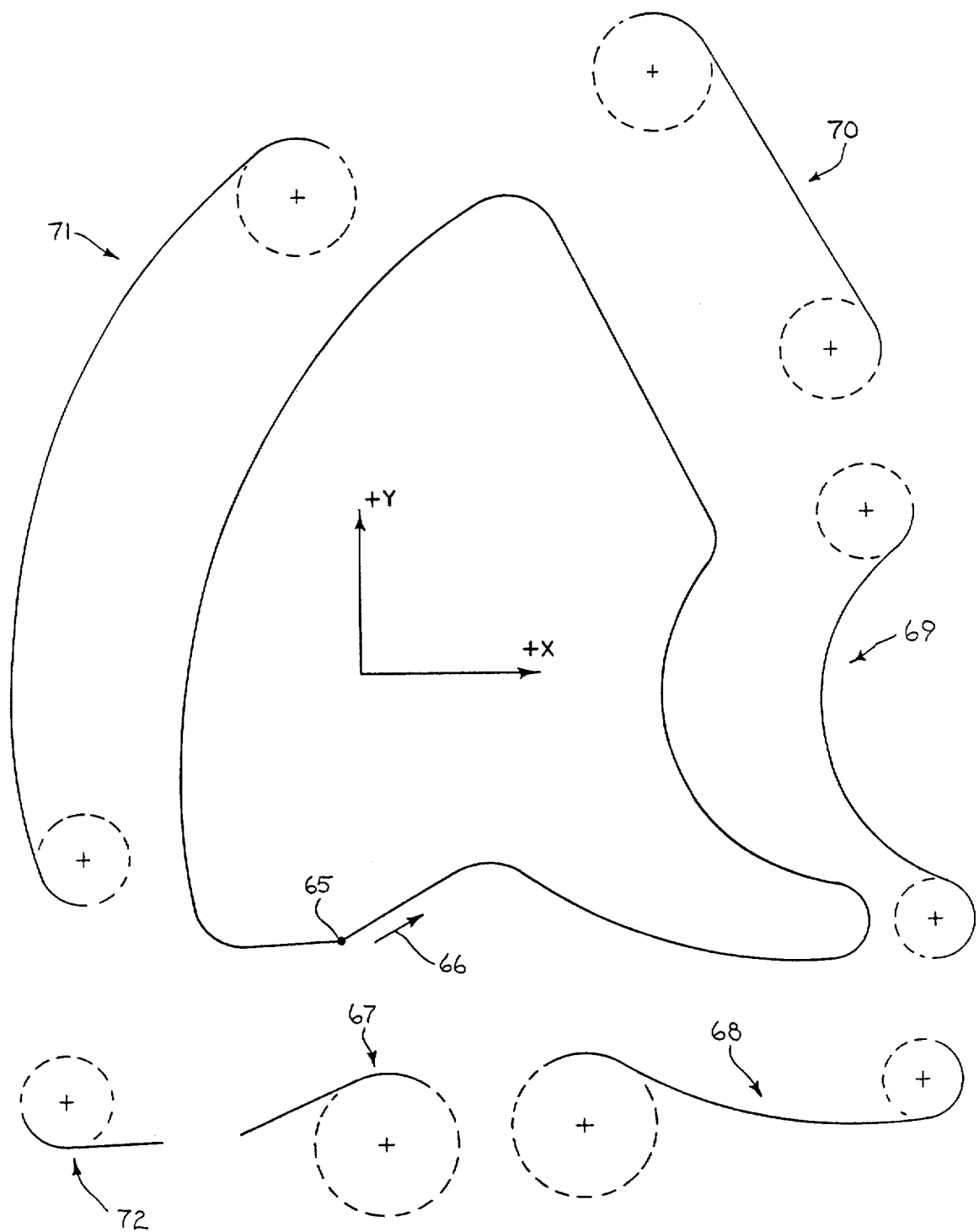
FIG. 13 is a schematic drawing illustrating how the part drawing of FIG. 11 is broken down into a string of composites selected from those illustrated in FIG. 12.

Referring particularly to FIG. 13, the programmer unit operator begins at a starting point 65 on the shape to be programmed and travels in the direction of the arrow 66 around its perimeter. The shape of the part as one travels around its perimeter may be described by a sequence of composites selected from the available set I-IV. Thus the illustrated part may be described by the successive line segments 67-72, the last of which ends at the starting point 65. The successive line segments are formed from selected ones of the set of composites I-IV as follows:

| Line Segment | Composite No. |
|---|---|
| 67 | III |
| 68 | IV |
| 69 | IV |
| 70 | III |
| 71 | IV |
| 72 | III |

Each composite No. I-IV relates to a class of specific, but dimensionless geometric shapes. Having established that a segment of a part may be generally described by a particular composite, the task of specifically defining the line segment is reduced to the task of inputting dimensions. There is a minimum number of dimensions, or parameters, required to specifically define a line segment indicated by one of the composite numbers I-IV and the programmer unit is designed to elicit from the operator those dimensions which will accomplish this. For some of the composites, however, there are other dimensions which may be encountered on part drawings and which will serve to define the line segment. Table A is a list of the dimensions relevant to each composite number. Those which are underscored are not requested by the programmer unit, but may be employed to calculate the dimensions which are required.

TABLE A

| Composite No. | | Parameters |
|---|---|---|
| I | X | dimension between starting point and end of line. |
| | Y | dimension between starting point and end of line. |
| | H | dimension which is the length of the straight line. |
| | A | dimension which is the angle of the straight line. |
| II | X | dimension between center of the first circle and center of second circle. |
| | Y | dimension between center of first circle and center of second circle. |
| | ($R_1$) | Radius of first circle. |
| | ($R_2$) | Radius of second circle. |
| III | X | dimension between center of first circle and center of second circle. |
| | Y | dimension between center of first circle and center of second circle. |
| | ($R_1$) | Radius of first circle. |
| | ($R_2$) | Radius of second circle. |
| | A | dimension which is the angle of the straight line connecting the two circles. |
| IV | X | dimension between center of first circle and center of third circle. |
| | Y | dimension between center of first circle and center of third circle. |
| | ($R_1$) | Radius of first circle. |
| | ($R_2$) | Radius of second, or "connecting" circle. |
| | ($R_3$) | Radius of third circle. |

As described in the above-cited U.S. Pat. No. 4,152,765, the programmer unit interacts with the operator to obtain the identity of the successive composites which form the part, and with respect to each selected composite, to obtain the dimensions which define the geometric shape. The sequence of events is controlled by a main routine which is stored in the memory 10 of the programmer unit.

Figure 5:
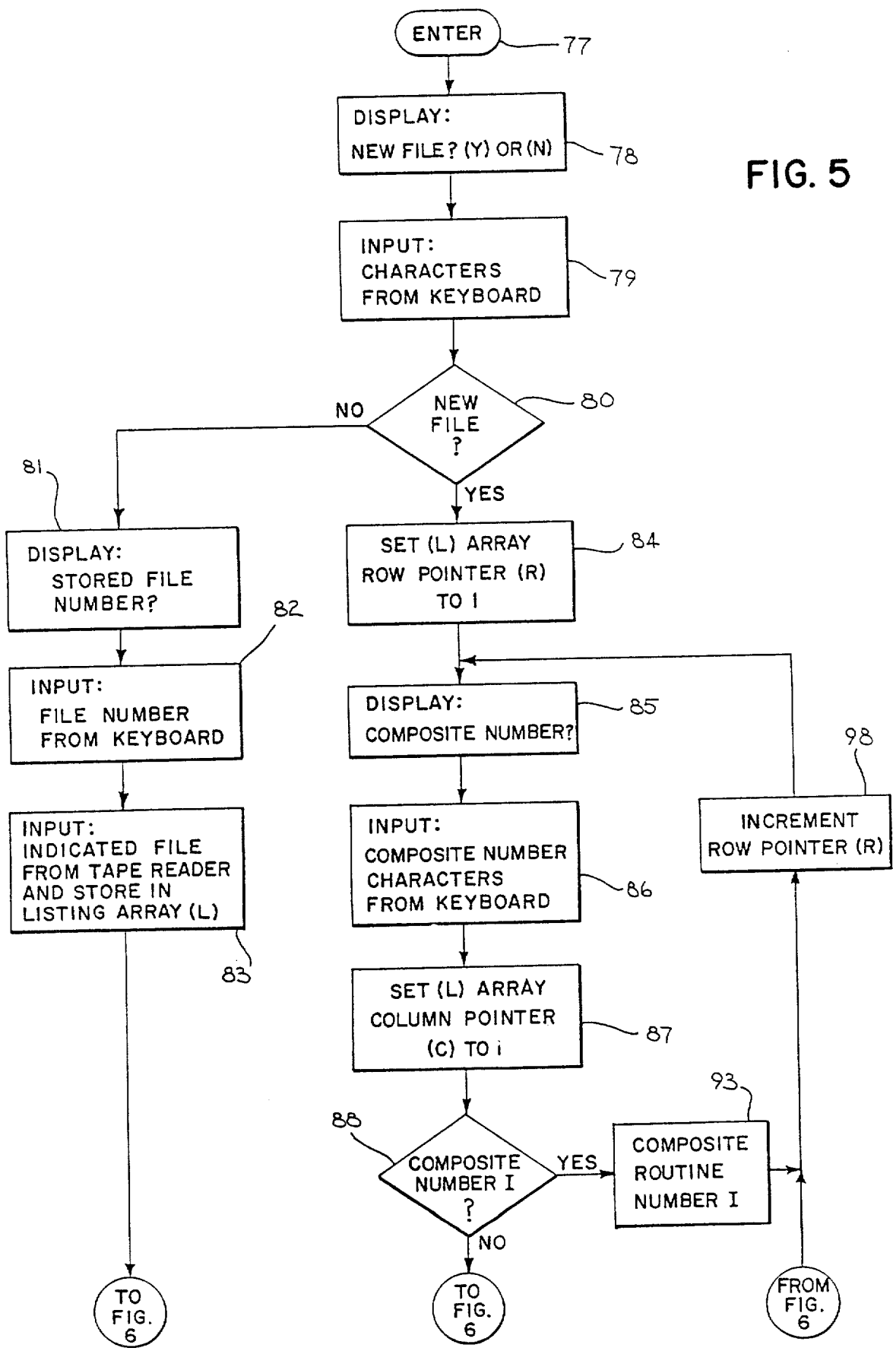
Figure 6:
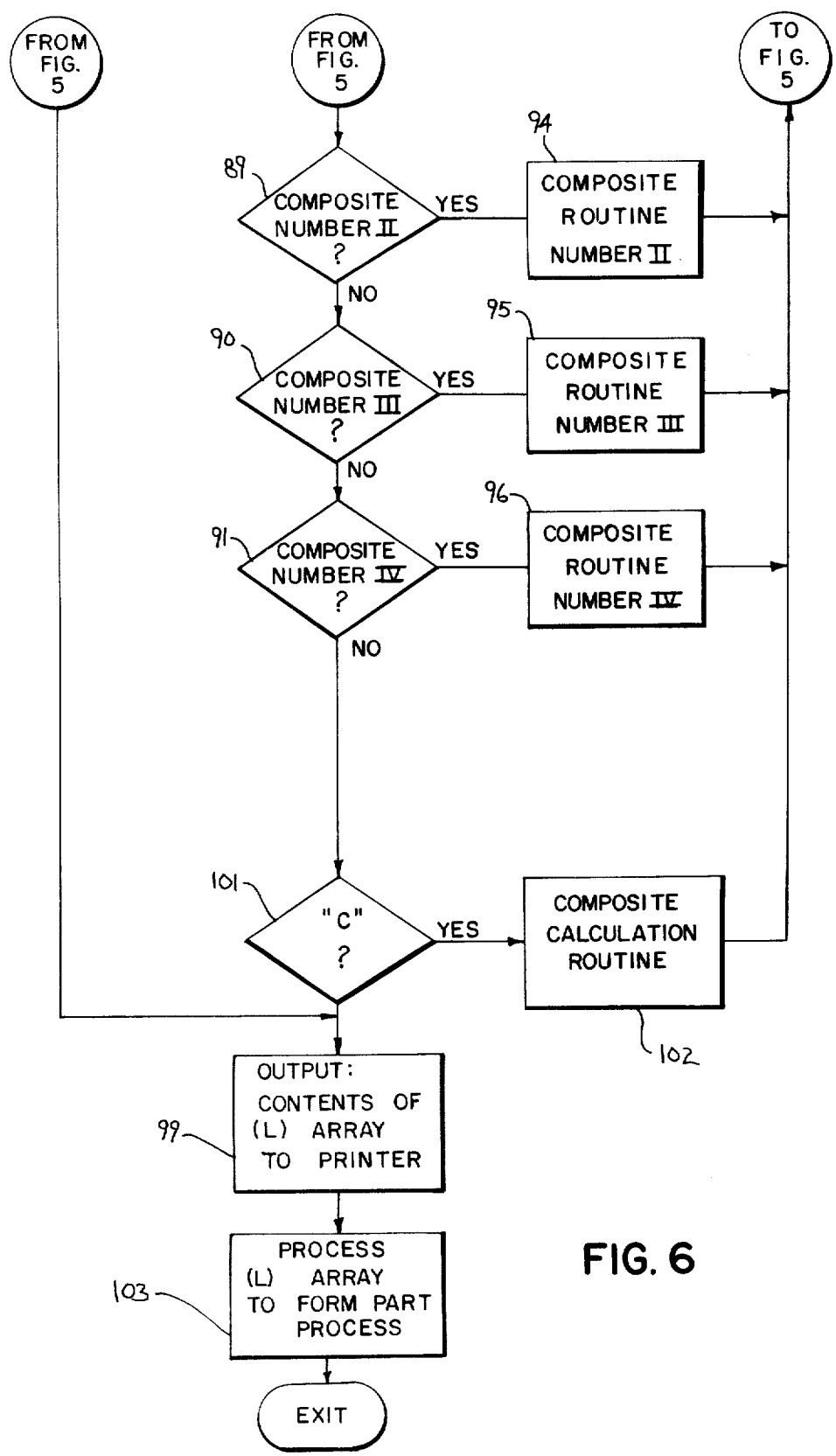

Referring particularly to FIGS. 5 and 6, the main routine is entered at the point 77 and a first instruction indicated by a process block 78 outputs data to the alpha-numeric display 3 which asks the operator whether an existing part program data file is to be employed or whether a new part program data file is to be developed. An instruction indicated by a process block 79 inputs the operator's response (Y or N) and a branch is established by a decision block 80. If an existing part program file is desired, an instruction indicated by a process block 81 couples data to the alpha-numeric display 3 which asks the operator to identify the desired file number. Responsive data is then coupled from the keyboard 1 as indicated by the process block 82 and the indicated part program file is then read in from the tape cassette 2 and stored in the (L) array 75 of the memory 10 as indicated by the process block 83.

If a new part program file is to be developed, a branch does not occur at the decision block 80. Instead, preparation for the development of a part program data file in the (L) array 75 is begun by setting a row pointer (R) to "one" as indicated by a process block 84. As indicated by a process block 85 the operator is then asked to enter the identity of the first composite on the part to be described. The response from the operator is input from the keyboard 1 as indicated by the process block 86, and a column pointer (C) for the (L) array 75 is then set to "one" as indicated by the process block 87. The identity of the selected composite number is then determined by a set of instructions which are indicated by the successive decision blocks 88-91 and 101. Having identified the selected composite (I-IV), a corresponding composite routine indicated by the respective process blocks 93-96 is executed. As described in my prior U.S. Pat. No. 4,152,765, each composite routine displays a succession of messages to the operator requesting the dimensional data needed to define the selected composite. The data thus entered is stored in the line of the (L) array 75 indicated by the row pointer (R) at the position indicated by the column pointer (C). After the selected composite has been completely defined, the system loops back to an instruction indicated by the process block 98 which is executed to increment the row pointer (R). The system then repeats the process of identifying the next composite needed to define the boundary of the part.

The (L) array 75 is thus filled with data which defines the part as a series of composite numbers and associated dimensions. When a "zero" is entered in response to the composite number question posed by the process block 85, the loop is exited to a process block 99 shown in FIG. 6.

Instructions indicated by the process block 99 and process block 103 are then executed to output the contents of the (L) array to the printer and then to transform the contents of the (L) array into the (O) array 116. This is then processed into a part program suitable for running a numerically controlled machine tool as described in the above-cited patent.

Referring to FIG. 6, if the operator encounters unusual dimensions on a part drawing he may not be able to proceed with part program development by selecting one of the composite numbers. In such case, the operator enters a "C" in response to the programmer unit prompt and the system branches at decision block 101. A composite calculation routine 102 is then entered and executed to assist the operator by obtaining the required information.

Referring particularly to FIGS. 7-10, the composite calculation routine is entered at 105 and a set of instructions indicated by process block 106 are executed to output a prompt message to the operator. The operator responds by entering a composite number I-IV, as indicated at 107, to inform the system which shape, or composite, is involved. The operator response is analyzed by instructions indicated at decision blocks 108-111 and the system branches to the appropriate computational routine 113-116. If the operator response is a "P", as determined at decision block 118, a hardcopy flag is set and the system loops back to process block 106. A type "O" response from the operator causes the system to exit the routine back to the main program.

Referring still to FIG. 7-10, when the system branches to one of the computational routines 113-116, a further series of questions concerning the geometry in question are displayed to the operator. When sufficient data has been input, the routines 113-116 perform the necessary calculations and return to the composite calculation routine with the required data. This data is displayed as indicated at process block 119, and is output to the printer if the hardcopy flag is set. The system then loops back to process block 106 to prompt the operator for the next function to be performed. A listing of the composite calculation routine is provided in Appendix A.

Figure 7:
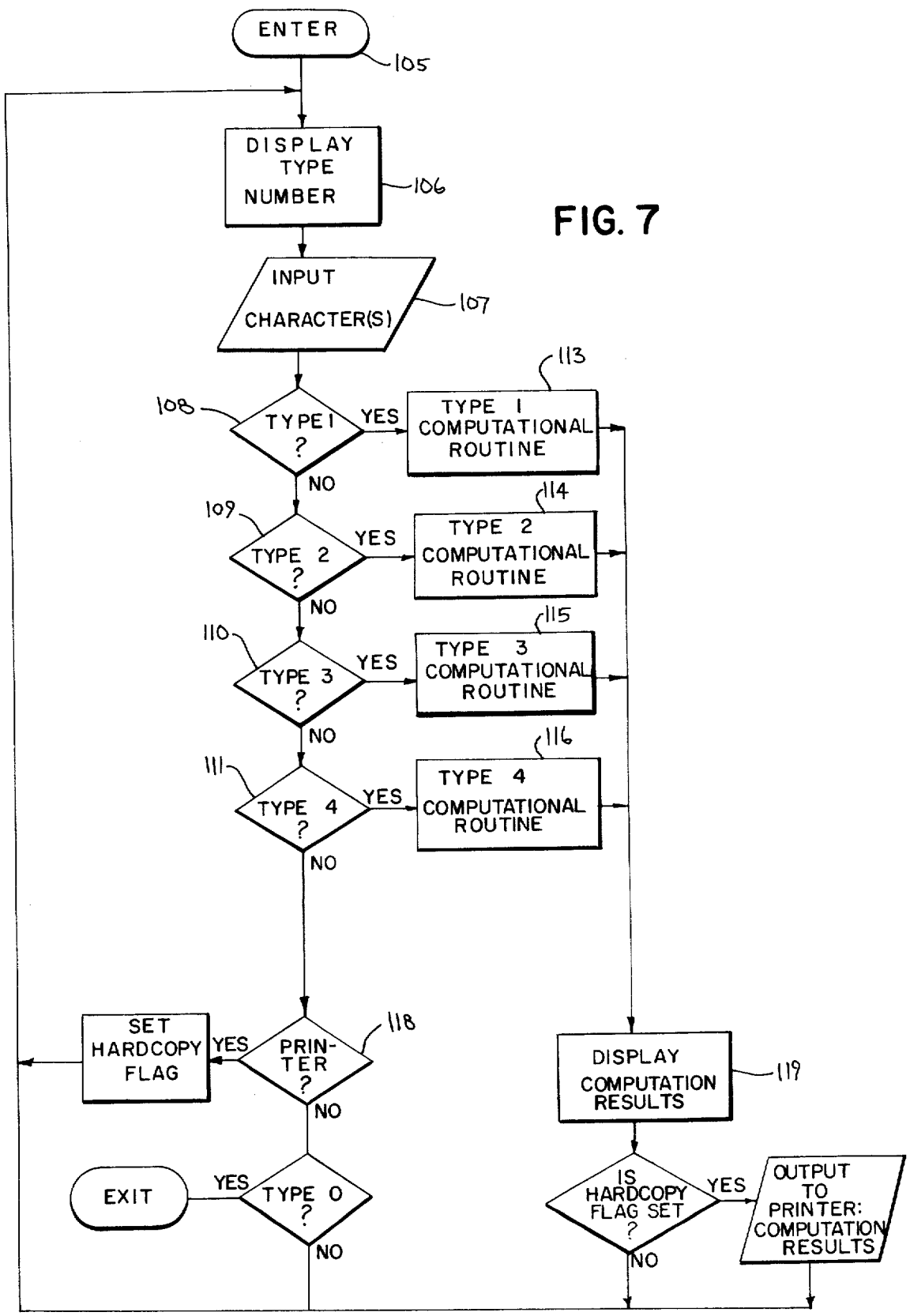
FIG. 7 is a flow chart of the composite calculation routine which forms part of the system of FIGS. 5 and 6, FIGS. 8, 9 and 10 are flow charts of computational routines which form part of the system of FIG. 7.
Figure 8:
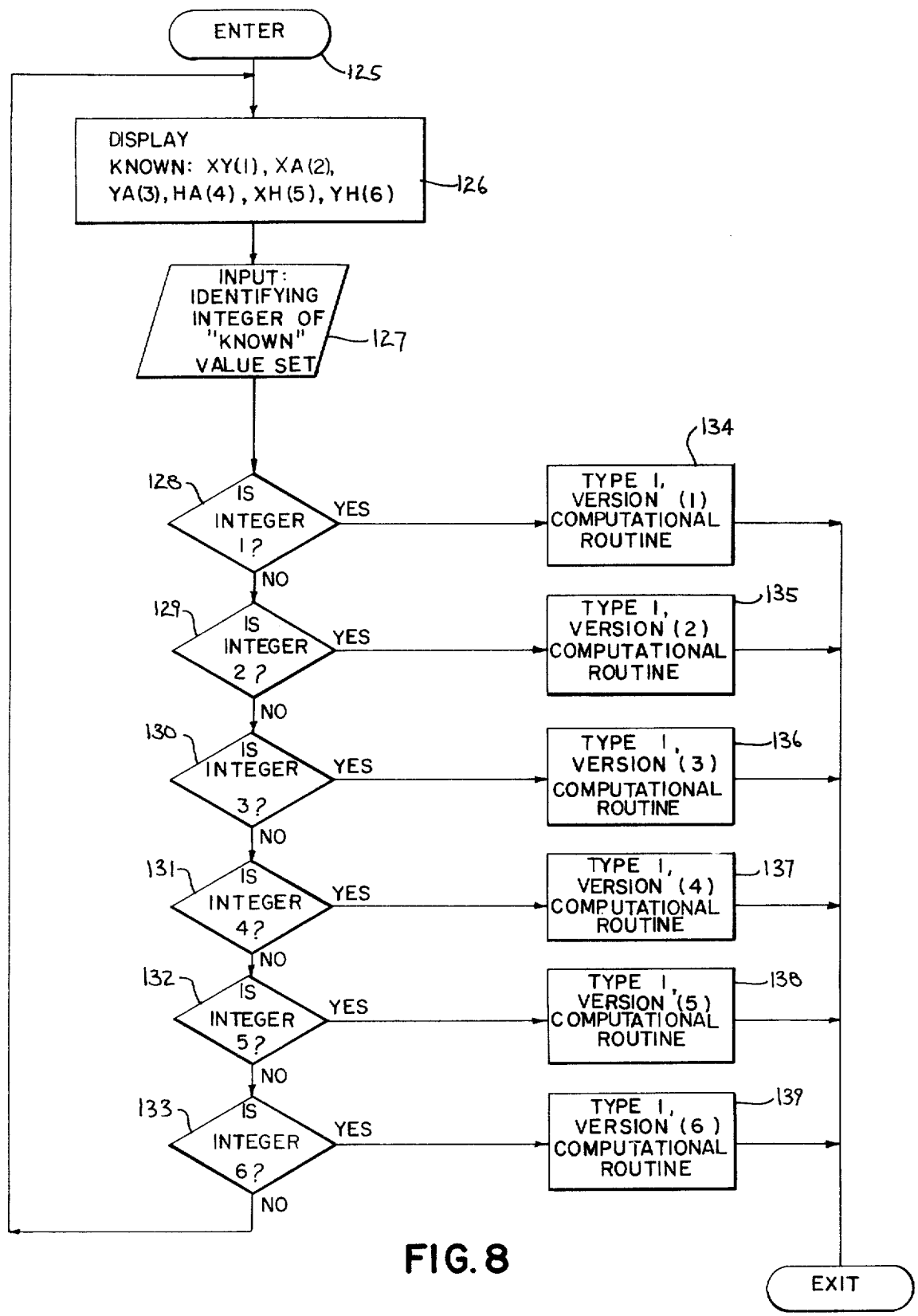

Referring particularly to FIGS. 7 and 8, when a Type "I" composite is selected by the operator in response to the programmer unit prompt, the system enters the type one computational routine 113 at the point 125. As indicated by process block 126, the programmer unit displays six sets of parameters, any one of which sets will specifically define a straight line (i.e. a Type I composite). The operator makes a selection of one of these sets, as indicated at block 127, and this selection is analyzed at decision blocks 128-133. One of the computational routines indicated by process blocks 134-139 is then entered and the programmer unit prompts the operator to enter the known set of parameters he has selected. The computational routines 134-139 then calculate all of the remaining parameters for the specified straight line and returns to display the results at process block 119. Table B is a list of the resulting data which is output to the printer for each version of the type I computational routine.

TABLE B

| COMPOSITE TYPE I | | | | |
|---|---|---|---|---|
| VERSION (1) | | | | |
| INPUT | | OUTPUT | | |
| X = 1.1600 | Y = .7200 | H = 1.3653 | A = 58.1726 | |
| VERSION (2) | | | | |
| INPUT | | OUTPUT | | |
| X = 1.2000 | A = 58.0000 | Y = .7498 | H = 1.4150 | |
| VERSION (3) | | | | |
| INPUT | | OUTPUT | | |
| Y = .8000 | A = 55.0000 | X = 1.1425 | H = 1.3948 | |
| VERSION (4) | | | | |
| INPUT | | OUTPUT | | |
| H = 1.3500 | A = 64.0000 | X = 1.2134 | Y = .5918 | |
| VERSION (5) | | | | |
| INPUT | | OUTPUT | | |
| X = 1.2134 | H = 1.3500 | Y = .5918 | A = 64.0000 | |
| VERSION (6) | | | | |
| INPUT | | OUTPUT | | |
| Y = .5918 | H = 1.3500 | X = 1.12134 | A = 64.0000 | |

Figure 9:
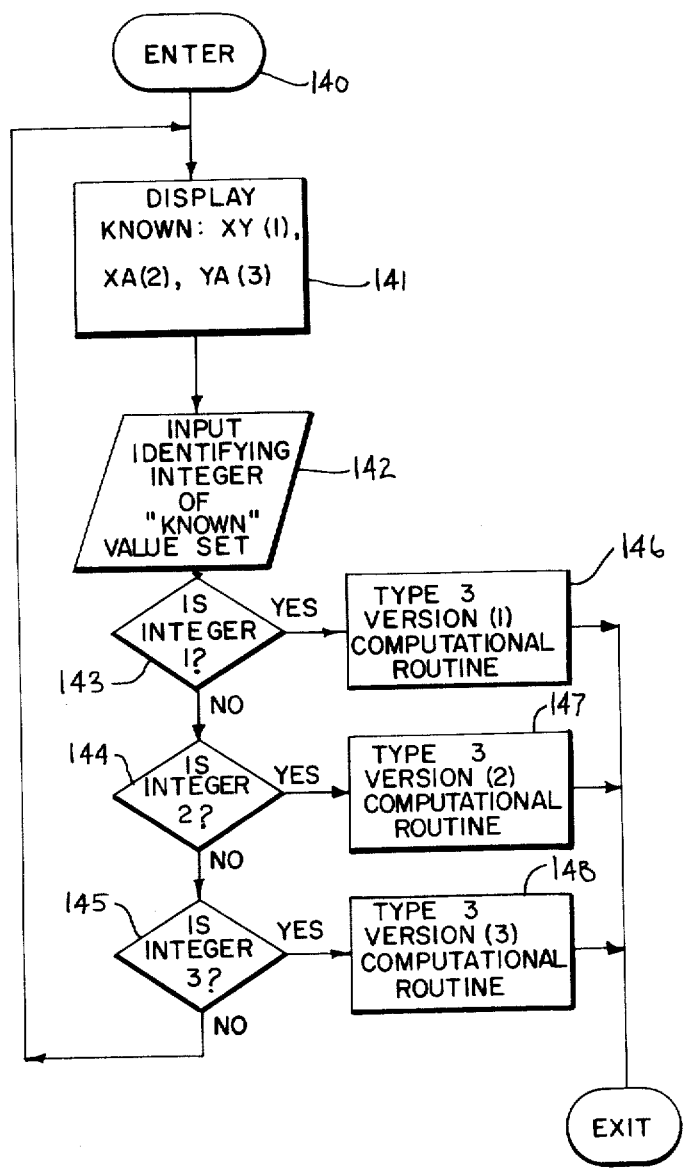

Referring particularly to FIGS. 7 and 9, if the operator has difficulty providing proper dimensions for a Type III composite, he enters data in response to prompting messages which cause the system to branch to the Type III computational routine 115. This routine is entered at 140 and the programmer unit displays data indicated at process block 141 prompting the operator to indicate which Type III parameters are known. The responsive data is input as indicated at block 142 and the system determines which set of parameters are known at decision blocks 143-145. The appropriate routine 146-148 is then executed to output the other parameters for a Type III composite. Table C is a list of the data which is output to the printer for each version of the type III computational routine.

TABLE C

| COMPOSITE TYPE III | | | | | |
|---|---|---|---|---|---|
| VERSION (1) | | | | | |
| INPUT | | OUTPUT | | | |
| X = 1.2500 | Y = .7200 | | A = 30.5734 | | |
| R1 = −.5000 | R2 = .2100 | TAN R1, | X = .4305 | Y = −.2543 | |
| | | TAN R2, | X = −.1808 | Y = .1068 | |
| VERSION (2) | | | | | |
| INPUT | | OUTPUT | | | |
| X = 1.3000 | A = 32.0000 | | Y = .9859 | | |
| R1 = −.4000 | R2 = .1800 | TAN R1, | X = .3392 | Y = −.2120 | |
| | | TAN R2, | X = −.1527 | Y = .0954 | |
| VERSION (3) | | | | | |
| INPUT | | OUTPUT | | | |
| Y = .9000 | A = −5.0000 | | X = .5737 | | |
| R1 = −.4500 | R2 = .2000 | TAN R1, | X = .4483 | Y = .0392 | |
| | | TAN R2, | X = −.1992 | Y = −.0174 | |

It should be noted that the Type III computational routine not only calculates the parameters needed to specify a Type III composite to the programmer unit, but it also calculates the coordinates of the tangency points on each circle. The same is true of the Type IV computational routine 116 as well as the Type II computational routine.

Figure 10:
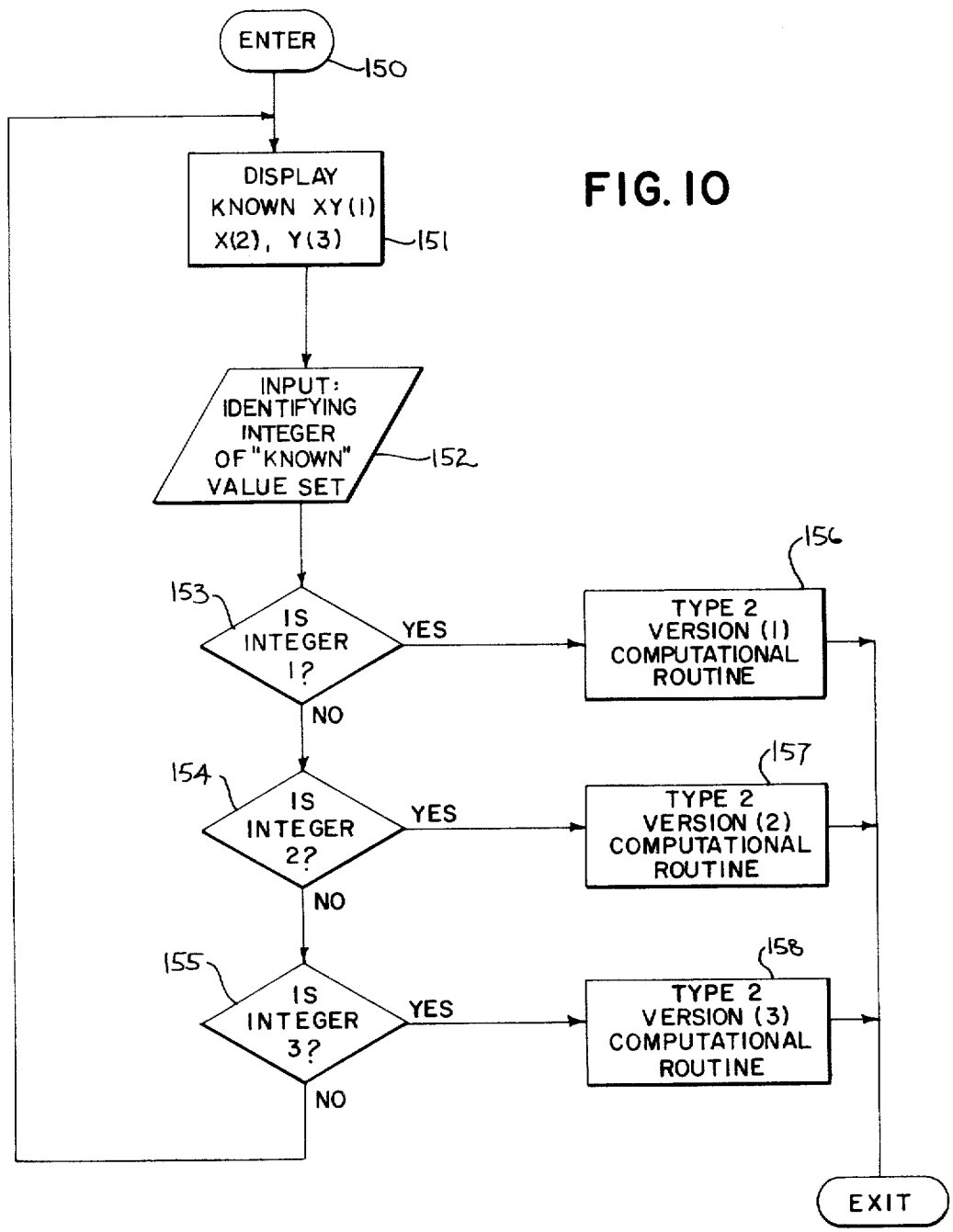

Referring to FIGS. 7 and 10, the Type II computational routine 114 is intered at 150 and the operator is prompted to select one of three known sets of parameters by a set of instructions indicated by process block 151. The selection is input as indicated at block 152 and analyzed by instructions indicated by decision blocks 153-155. The appropriate computational routine 156-158 is then entered and executed to generate the data indicated in Table D.

TABLE D

| COMPOSITE TYPE II | | | |
|---|---|---|---|
| VERSION (1) | | | |
| INPUT | | OUTPUT | |
| X = .7100 | Y = .3800 | TAN R1, X = .4408 | Y = .2359 |
| R1 = −.5000 | R2 = .2700 | TAN R2, X = −.2692 | Y = −.1441 |
| MIS-MATCH IN RADII OF | .0353 | | |
| MAJOR CIRCLE IS R1 | | MINOR CIRCLE R2 = .3053 | |
| VERSION (2) | | | |
| INPUT | | OUTPUT | |
| X = .6200 | | Y = .4220 | |
| R1 = .5000 | R2 = −.2500 | TAN R1, X = .4133 | Y = .2813 |
| | | TAN R2, X = −.2067 | Y = −.1407 |
| CHANGE SIGN OF ALL Y VALUES TO OBTAIN SECOND SOLUTION | | | |
| VERSION (3) | | | |
| INPUT | | OUTPUT | |
| Y = −1.1700 | | X = .1533 | |
| R1 = −.4300 | R2 = .7500 | TAN R1, X = .0559 | Y = −.4264 |
| | | TAN R2, X = −.0974 | Y = .7436 |
| CHANGE SIGN OF ALL X VALUES TO OBTAIN SECOND SOLUTION | | | |

It should be noted that when all of the parameters are known as in the example for version (1) in Table D, any inconsistency in the specified input data is indicated as a "mis-match" in the specified radii R1 and R2. If so, the programmer unit will then instruct the operator to select either R1 or R2 as the "major circle", and then it will compute the radius of the other circle to satisfy the other input parameters. This feature is particularly valuable when the operator is using "over dimensioned" drawings and the draftsman either rounded off numbers or was careless with the dimensioning.

Figure 14:
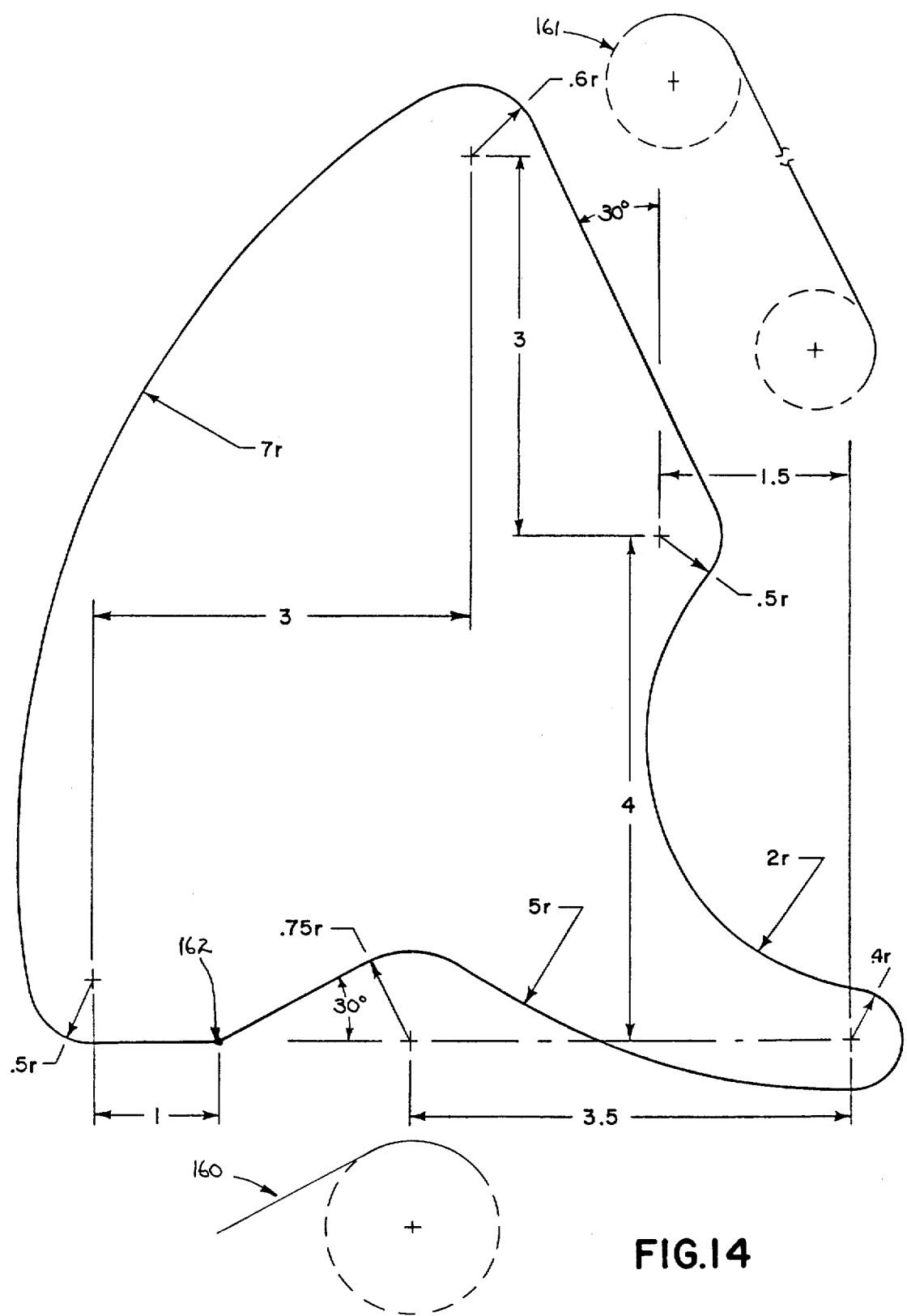
FIG. 14 is the part drawing of FIG. 11 dimensioned in a less conventional manner.

An explanation of how the present invention is employed to facilitate the development of a part program will now be made with respect to the piece part drawing of FIG. 14. The part shown is the same as that in FIG. 11. However, it has been dimensioned differently so that the composites 160 and 161 are each missing an X dimension. Instead, the angle of the straight line is given. Consequently, as the operator approaches the first of these two segments, he inputs a "C" to enable the composite calculation means. The programmer unit responds by requesting a composite number, which in this example is a Type III. The angle A is known and the Y dimension between centers of R1 and R2 is known (i.e. zero), and thus when the programmer unit requests a version number, a (3) is entered. The composite calculation means then calculates and outputs the needed "X" dimension of 1.5 inches and the operator can then return to part program development with the required parameter values.

As described previously, the operator continues to select composite numbers and enter the required parameter values until he works around to the composite 161 portion of the drawing. Again, he does not have the required "X" dimension, and as a result, he enters "C" to call up the composite calculation means. By entering the "Y" dimension and the angle "A", which are provided on the drawing, the required "X" dimension is calculated and displayed. The operator then selects Composite III and enters the value for X, Y, R1 and R2 as requested by the programmer unit.

The programmer unit of the present invention thus provides an on line, interactive means for calculating dimensional data needed for part program development from dimensional data which is available on the part drawing. The invention is not directed to the machine or the method of performing the calculations needed to solve the geometric problems which are presented. Rather, it is directed to a programmer unit, which in addition to the part development apparatus, provides a means selectable by the operator for deviating from the normal part development process to define and solve geometric problems which will enable the operator to continue. It should be apparent to those skilled in the art that other composites may be defined and added to the system, and that corresponding composite calculation means may also be added to facilitate the use of these additional composites.

APPENDIX A

| Composite Calculation Routine |
|---|
| 300 INPUT "TYPE NUMBER, PROCEED",R$ |
| 305 T=0 |
| 310 IF (R$="T") OR (R$="P") THEN 365 |
| 315 IF R$<>"PROCEED" THEN 335 |
| 325 IF Source =0 THEN LOAD "DIRECT" |
| 330 LOAD "PROMPT", Cal return |
| 335 X0=Y0=T0=M0=Z5=A7=X7=Y7=P9=0 |
| 340 CALL Tests(L1,R,R$,S$) |
| 345 IF (L1=998) OR (Li=999) THEN 300 |
| 350 T=ABS(INT(L1)) |
| 355 IF T=8 THEN 365 |
| 360 IF T<>9 THEN 375 |
| 365 CAL12=1 |
| 370 LOAD "CAL2:T15",Entry |
| 375 CAL12=0 |
| 380 IF T<>1 THEN 865 |
| 385 GOSUB 265 |
| 390 INPUT "KNOWN: XY(1),XA(2),YA(3), HA(4),XH(5),YH(6)",L1 |
| 395 IF (L1<1) OR (L1>6) THEN 390 |
| 400 J0=ABS(INT(L1)) |
| 405 IF (J0>2) AND (J0<>5) THEN 440 |

APPENDIX A-continued

| Composite Calculation Routine |
|---|
| 410 GOSUB 1655 |
| 415 IF J0=2 THEN 505 |
| 420 IF J0=5 THEN 530 |
| 425 B$=" Y=" |
| 430 I0=2 |
| 435 GOTO 455 |
| 440 IF J0=4 THEN 480 |
| 445 A$=" Y=" |
| 450 I0=1 |
| 455 V$="Y=" |
| 460 GOSUB 1680 |
| 465 IF J0=1 THEN 560 |
| 470 IF J0=6 THEN 530 |
| 475 GOTO 505 |
| 480 A$=" H=" |
| 485 I0=1 |
| 490 V$="H=" |
| 495 GOSUB 1680 |
| 500 S(1)=ABS(S(1)) |
| 505 B$=" A=" |
| 510 I0=2 |
| 515 V$="A=" |
| 520 GOSUB 1680 |
| 525 GOTO 605 |
| 530 B$=" H=" |
| 535 I0=2 |
| 540 V$="H=" |
| 545 GOSUB 1680 |
| 550 S(2)=ABS(S(2)) |
| 555 GOTO 705 |
| 560 S(3)=SQR(S(1)*S(1)+S(2)*S(2)) |
| 565 IF S(3)=0 THEN 840 |
| 570 G1=S(1) |
| 575 G2=S(2) |
| 580 GOSUB 3375 |
| 585 S(4)=90-L2 |
| 590 C$=" H=" |
| 595 D$=" A=" |
| 600 GOTO 775 |
| 605 S1=SIN(90-S(2)) |
| 610 C1=COS(90-S(2)) |
| 615 IF J0=4 THEN 680 |
| 620 IF S(1)<=0 THEN 840 |
| 625 IF J0=3 THEN 650 |
| 630 IF SGN(S(1))<>SGN(C1) THEN 840 |
| 635 C$=" Y" |
| 640 S(3)=S(1)*S1/C1 |
| 645 GOTO 665 |
| 650 IF SGN(S(1))<>SGN(S1) THEN 840 |
| 655 C$=" X=" |
| 660 S(3)=S(1)*C1/S1 |
| 665 D$=" H=" |
| 670 S(4)=SQR(S(1)*S(1)+S(3)*S(3)) |
| 675 GOTO 775 |
| 680 C$=" X=" |
| 685 D$=" Y=" |
| 690 S(3)=S(1)*C1 |
| 695 S(4)=S(1)*S1 |
| 700 GOTO 775 |
| 705 C$=" X=" |
| 710 IF J0=5 THEN C$=" Y=" |
| 715 D$=" A=" |
| 720 S(3)=S(2)*(2)-S(1)*S(1) |
| 725 IF S(3)<0 THEN 840 |
| 730 S(3)=SQR(S(3)) |
| 735 IF J0=6 THEN 755 |
| 740 G1=S(1) |
| 745 G2=S(3) |
| 750 GOTO 765 |
| 755 G1=S(3) |
| 760 G2=S(1) |
| 765 GOSUB 3375 |
| 770 S(4)=90-L2 |
| 775 OUTPUT Q$ USING 70;A$,S(1),B$, S(2),C$,S(3),D$,S(4) |
| 780 GOSUB Print |
| 785 IF J0<>5 THEN 800 |
| 790 S(4)=(180-S(4))*(S(4)>=0)-(180+S(4))*(S(4)<0) |
| 795 GOTO 810 |
| 800 IF J0<>6 THEN 825 |
| 805 S(4)=-S(4) |

APPENDIX A-continued
Composite Calculation Routine

```
810  S(3) = -S(3)
815  OUTPUT Q$ USING 75;C$,S(3),D$,S(4)
820  GOSUB Print
825  OUTPUT Q$ USING "/"
830  GOSUB Print
835  GOTO 300
840  OUTPUT Q$ USING 80;A$,S(1),B$,S(2)
845  GOSUB Print
850  OUTPUT Q$ USING 85
855  GOSUB Print
860  GOTO 300
865  IF T<>2 THEN 1320
870  GOSUB 265
875  INPUT "KNOWN: XY(1), X(2), Y(3)",R$
880  CALL Tests(L1,R,R$,S$)
885  J0=ABS(INT(L1))
890  IF (J0<1) OR (J0>3) OR (L1-998) THEN 875
895  IF J0=3 THEN 930
900  GOSUB 1655
905  X=L1
910  B$=" Y ="
915  IF J0=2 THEN 960
920  I0=2
925  GOTO 945
930  A$=" Y ="
935  I0=1
940  B$=" X ="
945  V$="Y ="
950  GOSUB 1680
955  Y-L1
960  GOSUB 3065
965  C$="R1 ="
970  D$="R2 ="
975  E1=0
980  IF J0<>1 THEN 1160
985  GOSUB 3735
990  IF E1=0 THEN 1070
995  IF E1<>22 THEN 1285
1000 M8=ABS(H-L1)
1005 INPUT "MAJOR CIRCLE: R1(1) OR R2(2)",R$
1010 CALL Tests(L1,R,R$,S$)
1015 IF (L1<>1) AND (L1<>2) THEN 1005
1020 I0=L1+3
1025 K0=4*(I0=5)+5*(I0=4)
1030 S(6)=S(I0)+H
1035 IF SGN(S(6))=SGN(S(K0)) THEN 1045
1040 S(6)=S(I0)-H
1045 IF I0=4 THEN 1060
1050 R1=S(6)
1055 GOTO 1065
1060 R2=S(6)
1065 GOSUB 3735
1070 GOSUB 3445
1075 I=49
1080 OUTPUT Q$ USING 90;A$,S(1),B$,S(2),I,F(1),H(1)
1085 GOSUB Print
1090 I=50
1095 OUTPUT Q$ USING 90;C$,S(4),D$,
     S(5),I,F(1)-X,H(1)-Y
1100 GOSUB Print
1105 IF E1=22 THEN 1125
1110 OUTPUT Q$ USING "/"
1115 GOSUB Print
1120 GOTO 300
1125 I=I0+45
1130 J=49*(I=50)+50*(I=49)
1135 OUTPUT Q$ USING 100;M8
1140 GOSUB Print
1145 OUTPUT Q$ USING 95;I,J,S(6)
1150 GOSUB Print
1155 GOTO 300
1160 IF ABS(S(1))>ABS(S(1)))>R2) THEN 1270
1165 S(2)=SQR((R1-R2)*(R1-R2)-S(1)*S(1))
1170 IF J0=3 THEN 1185
1175 Y=S(2)
1180 GOTO 1190
1185 X=S(2)
1190 GOSUB 3735
1195 GOSUB 3445
1200 OUTPUT Q$ USING 105;A$,S(1),B$,S(2)
1205 GOSUB Print
1210 I=49
1215 OUTPUT Q$ USING 90;C$,R1,D$,R2,I,F(1),H(1)
1220 GOSUB Print
1225 I=50
1230 OUTPUT Q$ USING 110;I,F(1)-X,H(1)-Y
1235 GOSUB Print
1240 I=88*(J0=3)+89*(J0=2)
1245 OUTPUT Q$ USING 115;I
1250 GOSUB Print
1255 OUTPUT Q$ USING 50
1260 GOSUB Print
1265 GOTO 300
1270 OUTPUT Q$ USING 80;A$,S(1)
1275 GOSUB Print
1280 GOTO 1295
1285 OUTPUT Q$ USING 80;A$,S(1),B$S(2)
1290 GOSUB Print
1295 OUTPUT Q$ USING 80;C$,R1,D$,R2
1300 GOSUB Print
1305 OUTPUT Q$ USING 85
1310 GOSUB Print
1315 GOTO 300
1320 IF T<>3 THEN 1710
1325 GOSUB 265
1330 INPUT "KNOWN: XY(1),XA(2),YA(3)",R$
1335 CALL Tests(L1,R,R$,S$)
1340 J0=ABS(INT(L1))
1345 IF (J0<1) OR (J0>3) THEN 1330
1350 IF J0=3 THEN 1385
1355 GOSUB 1655
1360 X=L1
1365 IF J0=2 THEN 1415
1370 B$=" Y ="
1375 I0=2
1380 GOTO 1395
1385 A$=" Y ="
1390 I0=1
1395 V$="Y ="
1400 GOSUB 1680
1405 Y=L1
1410 IF J0=1 THEN 1435
1415 B$=" A ="
1420 I0=2
1425 V$="A ="
1430 GOSUB 1680
1435 GOSUB 3065
1440 C$="R1 ="
1445 D$="R2 ="
1450 E1=0
1455 IF J0>1 THEN 1485
1460 GOSUB 3735
1465 IF E1<>0 THEN 1620
1470 S(3)=90-A8
1475 E$=" A ="
1480 GOTO 1560
1485 C=COS(90-S(2))
1490 S=SIN(90-S(2))
1495 IF J0=3 THEN 1525
1500 IF C=0 THEN 1620
1505 E$=" Y ="
1510 Y=(R1-R2+X*S)/C
1515 S(3)=Y
1520 GOTO 1545
1525 IF S=0 THEN 1620
1530 E$=" X ="
1535 X=(Y*C-(R1-R2))/S
1540 S(3)=X
1545 E1=0
1550 GOSUB 3735
1555 IF E1<>0 THEN 1620
1560 GOSUB 3445
1565 OUTPUT Q$ USING 70;A$,S(1),B$,S(2),E$,S(3)
1570 GOSUB Print
1575 I=49
1580 OUTPUT Q$ USING 90;C$,R1,D$,R2,I,F(1),H(1)
1585 GOSUB Print
1590 I=50
1595 OUTPUT Q$ USING 110;I,F(2)-X,H(2)-Y
1600 GOSUB Print
1605 OUTPUT Q$ USING 50
1610 GOSUB Print
```

APPENDIX A-continued
Composite Calculation Routine

```
1615 GOTO 300
1620 OUTPUT Q$ USING 80;A$,S(1),B$,S(2)
1625 GOSUB Print
1630 OUTPUT Q$ USING 80;C$,R1,D$,R2
1635 GOSUB Print
1640 OUTPUT Q$ USING 85
1645 GOSUB Print
1650 GOTO 300
1655 A$=" X ="
1660 I0=1
1665 V$="X ="
1670 GOSUB 1680
1675 RETURN
1680 DISP V$;
1685 LINPUT R$
1690 CALL Tests(L1,R,R$,S$)
1695 IF L1=998 THEN 1680
1700 S(10)=L1
1705 RETURN
1710 IF T<4 THEN 300
1715 IF (T=44) OR (T=55) THEN 1725
1720 IF T>7 THEN 2520
1725 GOSUB 265
1730 INPUT "X=",R$
1735 CALL Tests(L1,R,R$,S$)
1740 IF L1=998 THEN 1730
1745 X=S(2)=L1
1750 A$=" X ="
1755 INPUT "Y=",R$
1760 CALL Tests(L1,R,R$,S$)
1765 IF L1=998 THEN 1755
1770 Y=S(3)=L1
1775 B$=" Y ="
1780 GOSUB 3065
1785 C$="R1 ="
1790 D$="R2 ="
1795 E$="R3 ="
1800 E1=0
1805 GOSUB 3735
1810 IF (T<>4) AND (Y<>44) THEN 1920
1815 IF E1=0 THEN 1850
1820 GOSUB 2955
1825 OUTPUT Q$ USING 80;E$,S(6)
1830 GOSUB Print
1835 OUTPUT Q$ USING 85
1840 GOSUB Print
1845 GOTO 300
1850 GOSUB 3445
1855 I=50
1860 GOSUB 2875
1865 I=50
1870 OUTPUT Q$ USING 125;E$,S(6),
     I,F(1)-I(1),H(1)-J(1)
1875 GOSUB Print
1880 OUTPUT Q$ USING 110;I,F(2)-I(1),H(2)-J(1)
1885 GOSUB Print
1890 I=51
1895 OUTPUT Q$ USING 110;I,F(2)-S(2),H(2)-S(3)
1900 GOSUB Print
1905 OUTPUT Q$ USING 50
1910 GOSUB Print
1915 GOTO 300
1920 IF (T<>5) AND (T<>55) THEN 2110
1925 IF E1=0 THEN 1995
1930 GOSUB 2955
1935 A$=" A "
1940 OUTPUT Q$ USING 80;E$,S(6),A$,S(7)
1945 GOSUB Print
1950 IF S(8)=2 THEN 1970
1955 OUTPUT Q$ USING 130
1960 GOSUB Print
1965 GOTO 1980
1970 OUTPUT Q$ USING 135
1975 GOSUB Print
1980 OUTPUT Q$ USING 85
1985 GOSUB Print
1990 GOTO 300
1995 GOSUB 3445
2000 I=50
2005 GOSUB 2875
2010 L1=1
2015 IF S(8)=2 THEN 2025
2020 L1=2
2025 A$=" A ="
2030 I=50
2035 OUTPUT Q$ USING 90;E$,S(6),A$,S(7),
     I,F(L1)-I(1),H(L1)-J(1)
2040 GOSUB Print
2045 L1=L1+1
2050 IF S(8)=2 THEN 2070
2055 OUTPUT Q$ USING 140;F(L1)-I(1),H(L1)-J(1)
2060 GOSUB Print
2065 GOTO 2080
2070 OUTPUT Q$ USING 145;F(L1)-I(1),H(L1)-J(1)
2075 GOSUB Print
2080 I=51
2085 OUTPUT Q$ USING 110;I,F(3)-S(2),H(3)-S(3)
2090 GOSUB Print
2095 OUTPUT Q$ USING 50
2100 GOSUB Print
2105 GOTO 300
2110 IF T<>6 THEN 2255
2115 IF E1=0 THEN 2170
2120 GOSUB 2955
2125 OUTPUT Q$ USING 80;E$,S(6)
2130 GOSUB Print
2135 A$="A1="
2140 B$="A2="
2145 OUTPUT Q$ USING 80;A$,S(7),B$,S(8)
2150 GOSUB Print
2155 OUTPUT Q$ USING 85
2160 GOSUB Print
2165 GOTO 300
2170 GOSUB 3445
2175 I=50
2180 GOSUB 2875
2185 I=50
2190 OUTPUT Q$ USING 125;E$,S(6),
     I,F(2)-I(1),H(2)-J(1)
2195 GOSUB Print
2200 A$="A1="
2205 B$="A2="
2210 I=50
2215 OUTPUT Q$ USING 90;A$,S(7),B$,S(8),
     I,F(3)-I(1),H(3)-J(1)
2220 GOSUB Print
2225 I=51
2230 OUTPUT Q$ USING 110;I,F(4)-S(2),H(4)-S(3)
2235 GOSUB Print
2240 OUTPUT Q$ USING 50
2245 GOSUB Print
2250 GOTO 300
2255 IF T<>7 THEN 300
2260 IF E1=0 THEN 2365
2265 GOSUB 2955
2270 A$="R4="
2275 OUTPUT Q$ USING 80;E$,S(6),A$,S(7)
2280 GOSUB Print
2285 A$=" A ="
2290 OUTPUT Q$ USING 80;A$,S(8)
2295 GOSUB Print
2300 OUTPUT Q$ USING 150;S(9)
2305 GOSUB Print
2310 OUTPUT Q$ USING 155;S(10)+48
2315 GOSUB Print
2320 IF S(11)=1 THEN 240
2325 OUTPUT Q$ USING 160
2330 GOSUB Print
2335 GOTO 2350
2340 OUTPUT Q$ USING 165
2345 GOSUB Print
2350 OUTPUT Q$ USING 85
2355 GOSUB Print
2360 GOTO 300
2365 GOSUB 3445
2370 I=50
2375 OUTPUT Q$ USING 120;A$,S(2),B$,S(3),I,I(1),J(1)
2380 GOSUB Print
2385 I=51
2390 OUTPUT Q$ USING 120;C$,S(4),D$,S(5),I,I(2),J(2)
2395 GOSUB Print
2400 I=49
```

APPENDIX A-continued
Composite Calculation Routine

```
2405  A$="R4="
2410  OUTPUT Q$ USING 90;E$,S(6),A$,S(7),I,F(1),H(1)
2415  GOSUB Print
2420  I=50
2425  A$=" A="
2430  OUTPUT Q$ USING 125;A$,S(8),
      I,F(1)-I(1),H(1)-J(1)
2435  GOSUB Print
2440  OUTPUT Q$ USING 170;S(9),F(2)-I(1),H(2)-J(1)
2445  GOSUB Print
2450  OUTPUT Q$ USING 174;S(10)+48,F(3)-I(2),H(3)-J(2)
2455  GOSUB Print
2460  IF S(11)=1 THEN 2480
2465  OUTPUT Q$ USING 180;F(4)-I(2),H(4)-J(2)
2470  GOSUB Print
2475  GOTO 2490
2480  OUTPUT Q$ USING 185;F(4)-I(2),H(4)-J(2)
2485  GOSUB Print
2490  I=52
2495  OUTPUT Q$ USING 110;I,F(4)-S(2),H(4)-S(3)
2500  GOSUB Print
2505  OUTPUT Q$ USING 50
2510  GOSUB Print
2515  GOTO 300
2520  IF (T<>10) AND (T<>100) THEN 300
2525  GOSUB 265
2530  IF T=10 THEN 2550
2535  V$="ENTRY ANGLE="
2540  GOSUB 3350
2545  A7=L1
2550  V$="X="
2555  A$=" X="
2560  GOSUB 3350
2565  X=L1
2570  V$="Y="
2575  B$=" C="
2580  GOSUB 3350
2585  Y=L1
2590  GOSUB 3065
2595  C$="R1="
2600  D$="R2="
2605  IF T=100 THEN 2615
2610  R2=R
2615  V$="EXIT ANGLE="
2620  GOSUB 3350
2625  A9=L1
2630  H=SQR(X*X+Y*Y)
2635  IF H=0 THEN 2980
2640  G1=X
2645  G2=Y
2650  GOSUB 3375
2655  A8=L1
2660  IF T=10 THEN 2720
2665  S5=SIN(A8-90+A7)
2670  C5=COS(A8-90+A7)
2675  IF ABS(S5)<.001 THEN 2980
2680  S7=SIN(90-A7)
2685  C7=COS(90-A7)
2690  I(1)=R1*((1-C5)*C7/S5+S7)
2695  J(1)=R1*((1-C5)*S7/S5-C7)
2700  F(1)=-R1*S7
2705  H(1)=R1*C7
2710  F(2)=-R1*(S5*C7+C5*S7)
2715  H(2)=-R1*(S5*S7-C5*C7)
2720  S5=SIN(90-A9-A8)
2725  C5=COS(90-A9-A8)
2730  IF ABS(S5)<.001 THEN 2980
2735  S8=SIN(A8)
2740  C8=COS(A8)
2745  I(2)=R2*((1-C5)*C8/S5+S8)+X
2750  J(2)=R2*((1-C5)*S8/S5-C8)+Y
2755  F(3)=-R2*S8
2760  H(3)=R2*C8
2765  F(4)=-R2*(S5*C8+C5*S8)
2770  H(4)=-R2*(S5*S8-C5*C8)
2775  I=32
2780  IF T=10 THEN 2910
2785  OUTPUT Q$ USING 190;A7,I(1),J(1)
2790  GOSUB Print
2795  I=50
2800  OUTPUT Q$ USING 120;A$,X,B$,Y,I,I(2),J(2)
2805  GOSUB Print
2810  I=49
2815  OUTPUT Q$ USING 90;C$,R1,D$,R2,I,F(1),H(1)
2820  GOSUB Print
2825  OUTPUT Q$ USING 195;A9,F(2),H(2)
2830  GOSUB Print
2835  I=50
2840  OUTPUT Q$ USING 110;I,F(3),H(3)
2845  GOSUB Print
2850  OUTPUT Q$ USING 110;I,F(4),H(4)
2855  GOSUB Print
2860  OUTPUT Q$ USING 50
2865  GOSUB Print
2870  GOTO 300
2875  OUTPUT Q$ USING 120;A$,S(2),B$,S(3),I,I(1),J(1)
2880  GOSUB Print
2885  I=49
2890  OUTPUT Q$ USING 90;C$,S(4),D$,S(5),I,F(1),H(1)
2895  GOSUB Print
2900  RETURN
2905  I=49
2910  OUTPUT Q$ USING 120;A$,X,B$,Y,I,I(2),J(2)
2915  GOSUB Print
2920  OUTPUT Q$ USING 125;C$,R1,I,F(3),H(3)
2925  GOSUB Print
2930  OUTPUT Q$ USING 195;A9,F(4),H(4)
2935  GOSUB Print
2940  OUTPUT Q$ USING 50
2945  GOSUB Print
2950  GOTO 300
2955  OUTPUT Q$ USING 80;A$,S(2),B$,S(3)
2960  GOSUB Print
2965  OUTPUT Q$ USING 80;C$,S(4),D$,S(5)
2970  GOSUB Print
2975  RETURN
2980  IF T=10 THEN 2995
2985  OUTPUT Q$ USING 200;A7
2990  GOSUB Print
2995  OUTPUT Q$ USING 80;A$,X,B$,Y
3000  GOSUB Print
3005  IF T=10 THEN 3025
3010  OUTPUT Q$ USING 80;C$,R1,D$,R2
3015  GOSUB Print
3020  GOTO 3035
3025  OUTPUT Q$ USING 80;C$,R1
3030  GOSUB Print
3035  OUTPUT Q$ USING 205;A9
3040  GOSUB Print
3045  OUTPUT Q$ USING 85
3050  GOSUB Print
3055  Z1=0
3060  GOTO 300
3065  V$="R1---MIND SIGN"
3070  GOSUB 3350
3075  R1=S(4)=R
3080  IF T<>10 THEN 3090
3085  RETURN
3090  V$[2,2]="2"
3095  GOSUB 3350
3100  R2=S(5)=R
3105  IF (T<>100) AND (T<>2) AND (T<>3) THEN 3115
3110  RETURN
3115  V$[2,2]="3"
3120  GOSUB 3350
3125  R3=S(6)=R
3130  IF (T<>4) AND (T<>44) THEN 3140
3135  RETURN
```

I claim:

1. A programmer unit for developing a part program for a numerical control system, the combination comprising:
   a memory for storing a plurality of multi-bit words;
   data bus means coupled to said memory means for writing data into selected locations in said memory and for reading data out of selected locations in said memory;

alpha-numeric display means coupled to the data bus means, said display means being operable in response to selected data on said data bus means to display messages for an operator;

keyboard means coupled to the data bus means, said keyboard means being operable in response to manual operations by the operator to generate data to the data bus means;

means for coupling data from said keyboard means which represents selected composite numbers and storing it in said memory;

means for coupling data from the keyboard means which represents sets of geometric data for defining shapes associated with said selected composite numbers and storing it in said memory;

means for reading said selected composite number data and said geometric data from said memory, and calculating therefrom move codes and associated geometric data which form a part program;

means for coupling data from the keyboard means which represents the selection of a composite calculation function;

means for coupling data from the keyboard means which represents a selected composite type number and storing it in said memory means, said composite type number corresponding to one of said composite numbers;

means for coupling data from the keyboard means which represents a set of known geometric data associated with said selected composite type number and storing it in said memory means; and means for reading the selected composite type number data and associated known geometric data from said memory means and calculating other geometric data that is associated with said selected composite type number.

2. The programmer unit as recited in claim 1 which also includes means coupled to said data bus for outputting message data to the alpha-numeric display means which prompts the operator to select from a plurality of sets of geometric data associated with said selected composite type number said set of known geometric data.

3. A programmer unit for developing a part program for a numerical control system, the combination comprising:

a memory for storing a plurality of multi-bit words;

data bus means coupled to said memory means for writing data into selected locations in said memory and for reading data out of selected locations in said memory;

alpha-numeric display means coupled to the data bus means, said display means being operable in response to selected data on said data bus means to display messages for an operator;

keyboard means coupled to the data means, said keyboard means being operable in response to manual operations by the operator to generate data to the data bus means; and processor means coupled to said data bus means and being operable to read program instructions out of said memory means and in response thereto perform a plurality of functions which comprise:

coupling data from the keyboard means which represents a selected composite number and storing it in said memory;

coupling data from the keyboard means which represents a set of geometric data associated with said selected composite number and storing the same in said memory;

coupling data from the keyboard means which represents the selection of a composite calulation;

coupling data from the keyboard means which represents a composite type number that corresponds to said selected composite number, and storing it in said memory;

coupling data from the keyboard means which represents a set of geometric data associated with said selected composite type number and storing it in said memory means; and calculating the values of other geometric data associated with said selected composite type number and outputting said calculated data to said alpha-numeric display means.

4. The programmer unit as recited in claim 3 in which said processor means also functions in response to said composite type number data coupled from the keyboard, to output to said display, data which represents a plurality of selectable sets of parameters, each of which sets will specifically define a geometric shape; and in which said processor means functions to input data from said keyboard means which indicates the selection of one of said sets of parameters.

5. In a programmer unit which generates part programs for numerically controlled machines by processing a series of stored composite numbers and required associated sets of geometric data into a series of move codes and associated data, the improvement comprising;

means for displaying messages and data to an operator;

means for inputting data from an operator;

means coupled to said display means for geneating prompting messages to the operator which request the entry of a composite number and its required associated set of geometric data;

means coupled to said input means for receiving data entered by the operator which indicates the selection of a composite calculation, and in response thereto, generating prompting messages to the operator through said display means which request the entry of a composite type number and any known geometric data associated with the selected composite type number; and means coupled to said last named means for calculating unknown geometric data associated with the selected composite type number.

* * * * *

UNITED STATES PATENT AND TRADEMARK OFFICE
CERTIFICATE OF CORRECTION

PATENT NO. : 4,328,550      Page 1 of 2
DATED     : May 4, 1982
INVENTOR(S) : John M. Weber It is certified that error appears in the above—identified patent and that said Letters Patent is hereby corrected as shown below:

| | |
|---|---|
| Column 1, line 8, | "system" should be -- systems -- |
| Column 2, line 30, | "inconsistant" should be -- inconsistent |
| Column 4, line 6, | "The" should be -- the -- |
| Column 6, line 2, | "ae" should be -- are -- |

APPENDIX A

| | |
|---|---|
| Column 12, line 740 | "G1-S(1)" should be -- G1=S(1) -- |
| Column 13, line 1160 | "IF ABS(S(1))> ABS(S(1))> R2 THEN 1270" should be -- <br> IF ABS(S(1))>ABS(R1-R2) THEN 1270 -- |
| Column 15, line 1810 | "IF (T<>4) AND (Y<>44) THEN 1920" should be -- <br> IF (T<>4) AND (T<>44) THEN 1920 -- |
| Column 16, Line 2320 | "IF S(11)=1 THEN 240" should be <br> -- IF S(11)=1 THEN 2340 -- |
| Column 17, line 2450 | "174" should be -- 175 -- |

UNITED STATES PATENT AND TRADEMARK OFFICE
CERTIFICATE OF CORRECTION

PATENT NO. : 4,328,550  Page 2 of 2
DATED : May 4, 1982
INVENTOR(S) : John M. Weber It is certified that error appears in the above—identified patent and that said Letters Patent is hereby corrected as shown below:

Column 17, line 2575    "B$="C=" should be -- B$="Y" --.

Column 19, line 56      after "data" insert -- bus --

Column 20, line 44,     "geneating" should be -- generating --

Signed and Sealed this

*Fifth* Day of *October 1982*

[SEAL]

*Attest:*

GERALD J. MOSSINGHOFF

*Attesting Officer*   *Commissioner of Patents and Trademarks*